(12) United States Patent
Lucas et al.

(10) Patent No.: US 11,332,177 B2
(45) Date of Patent: May 17, 2022

(54) CHARGING AND STORAGE CART WITH ACCESSORY MOUNTING SYSTEM AND METHOD

(71) Applicant: Ergotron, Inc., St. Paul, MN (US)

(72) Inventors: James Robert Lucas, Minneapolis, MN (US); David James Prince, Saint Paul, MN (US); John Kenneth Blomstrom, Minneapolis, MN (US); Mustafa Ali Ergun, Eden Prairie, MN (US)

(73) Assignee: Ergotron, Inc., St. Paul, MN (US)

( * ) Notice: Subject to any disclaimer, the term of this patent is extended or adjusted under 35 U.S.C. 154(b) by 334 days.

(21) Appl. No.: 16/775,007

(22) Filed: Jan. 28, 2020

(65) Prior Publication Data

US 2020/0247444 A1    Aug. 6, 2020

Related U.S. Application Data

(60) Provisional application No. 62/800,205, filed on Feb. 1, 2019.

(51) Int. Cl.
*B62B 3/00* (2006.01)
*B62B 3/02* (2006.01)
*B62B 3/10* (2006.01)
*B62B 5/00* (2006.01)
*H02J 7/00* (2006.01)
*A47B 31/00* (2006.01)

(52) U.S. Cl.
CPC .............. *B62B 3/005* (2013.01); *A47B 31/00* (2013.01); *B62B 3/004* (2013.01); *B62B 3/02* (2013.01); *B62B 3/10* (2013.01); *B62B 5/00* (2013.01); *H02J 7/0013* (2013.01); *A47B 2031/003* (2013.01); *B62B 2202/48* (2013.01); *B62B 2202/56* (2013.01); *B62B 2205/32* (2013.01)

(58) Field of Classification Search
CPC ................................ B60K 1/04; H01M 50/20
See application file for complete search history.

(56) References Cited

U.S. PATENT DOCUMENTS

| 4,733,703 | A | 3/1988 | Cimino |
| 6,003,685 | A | 12/1999 | Malin |
| 6,202,865 | B1 | 3/2001 | Kuo |

(Continued)

OTHER PUBLICATIONS

"Stewart Storage Cart", [Online] Retrieved from the Internet: <URL: http://www.cefinc.com/stewart-storage-cart/>, (2017), 1 pg.

*Primary Examiner* — Jonathan Ng
*Assistant Examiner* — James J Triggs
(74) *Attorney, Agent, or Firm* — Schwegman Lundberg & Woessner, P.A.

(57) ABSTRACT

A charging and storage cart can be configured to support and charge a plurality of electronic devices. The charging and storage cart can include a frame, a panel, a tray, a support bracket, and an extension. The panel can be secured to the frame and can include a body and plurality of apertures extending through the body. The support bracket can be coupled to the tray and can be configured to engage the panel to support the tray. The extension can be connected to the support bracket can be insertable into any aperture of the plurality of apertures to connect the tray to the body of the panel in any location as desired.

18 Claims, 17 Drawing Sheets

(56) References Cited

U.S. PATENT DOCUMENTS

| | | | |
|---|---|---|---|
| 6,218,796 B1 * | 4/2001 | Kozlowski | H02J 7/0044 |
| | | | 62/239 |
| 6,264,220 B1 | 7/2001 | Pierce et al. | |
| 6,591,995 B1 * | 7/2003 | Grove | A47F 5/0815 |
| | | | 211/87.01 |
| 7,160,113 B2 | 1/2007 | McConnell | |
| 7,595,995 B2 | 9/2009 | Hock | |
| 7,845,501 B1 * | 12/2010 | Fosburg | B25H 3/04 |
| | | | 211/70.6 |
| 8,033,620 B2 | 10/2011 | Retchloff | |
| 8,934,254 B2 | 1/2015 | Petrick et al. | |
| 8,944,444 B1 | 2/2015 | Tvrdy | |
| 9,289,896 B2 | 3/2016 | Cole | |
| 9,623,550 B2 | 4/2017 | Cole | |
| 2010/0295430 A1 | 11/2010 | Cheng | |
| 2014/0217044 A1 | 8/2014 | Cole | |

* cited by examiner

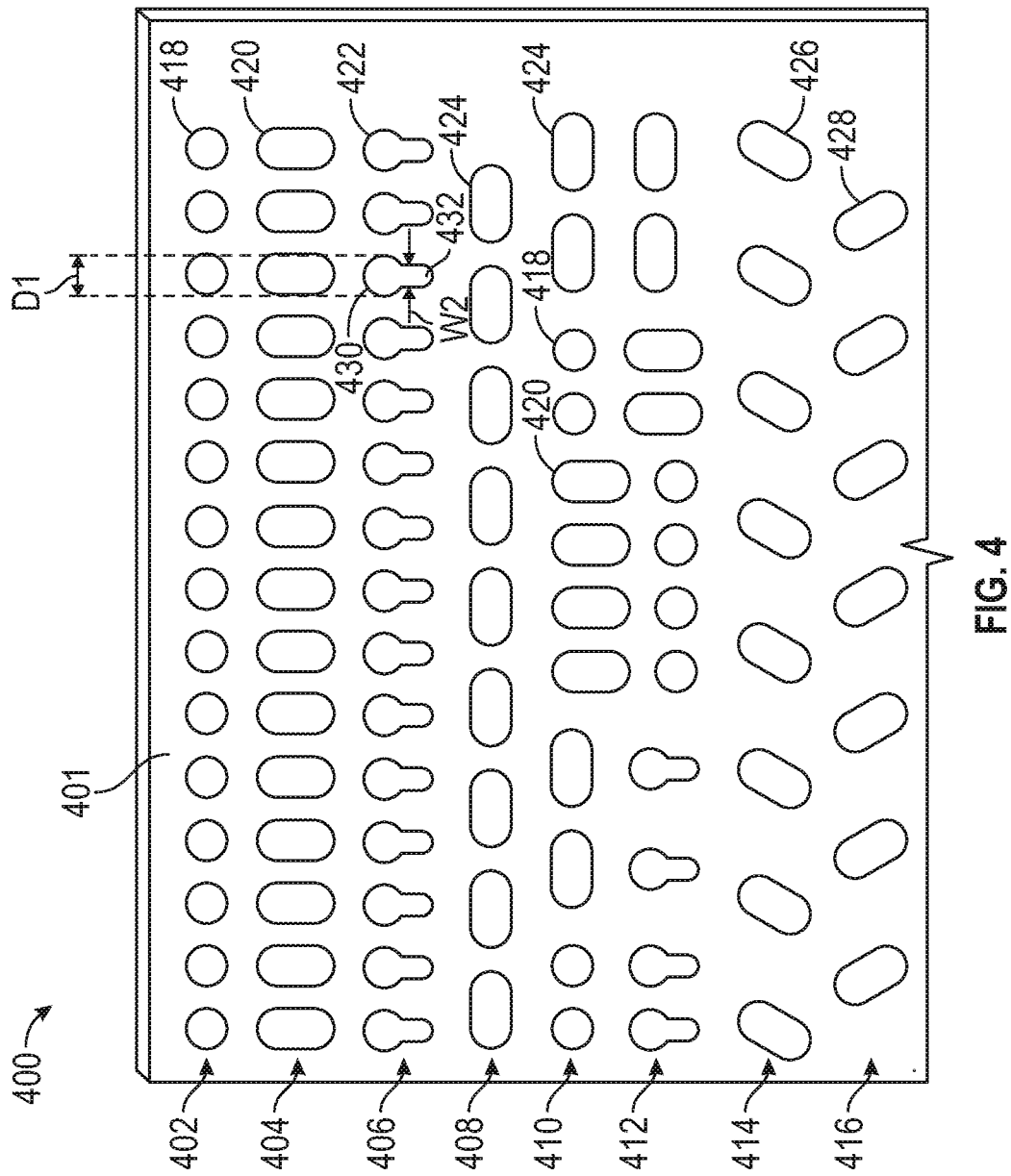

CHARGING AND STORAGE CART WITH ACCESSORY MOUNTING SYSTEM AND METHOD

CLAIM OF PRIORITY

This patent application claims the benefit of priority, under 35 U.S.C. Section 119(e), to James Robert Lucas U.S. Patent Application Ser. No. 62/800,205, titled "Charging And Storage Cart With Accessory Mounting System And Method," filed on Feb. 1, 2019, which is incorporated by reference herein in its entirety.

BACKGROUND

There are situations in which multiple portable computing devices, such as laptop/notebook computers, netbooks, tablets, and electronic readers, are simultaneously used. For example, 10 to 40 portable computing devices can be simultaneously used in a classroom for educational purposes. Typical portable computing devices include a battery that needs to be periodically recharged and software that needs to be periodically updated or maintained.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates a plan view of a plurality of holes for a panel of a storage and charging cart.

DETAILED DESCRIPTION

Storage carts can be used to store and charge multiple electronics devices at once. However, many carts used are simple metal cabinets with wheels that offer few features for use beyond storage and charging. This disclosure describes a storage cart that includes a surface to support an electronic or display device, such as a monitor, and includes a panel configured to receive a keyboard tray. These features can allow the storage cart to be used as a workstation in addition to a storage cart. In one example, a storage cart can include a mounting panel where a tray assembly can be connectable to the panel at any desired height, helping to allow a user to customize the workstation of the cart as desired.

The above discussion is intended to provide an overview of subject matter of the present patent application. It is not intended to provide an exclusive or exhaustive explanation of the invention. The description below is included to provide further information about the present patent application.

Figure 1A:
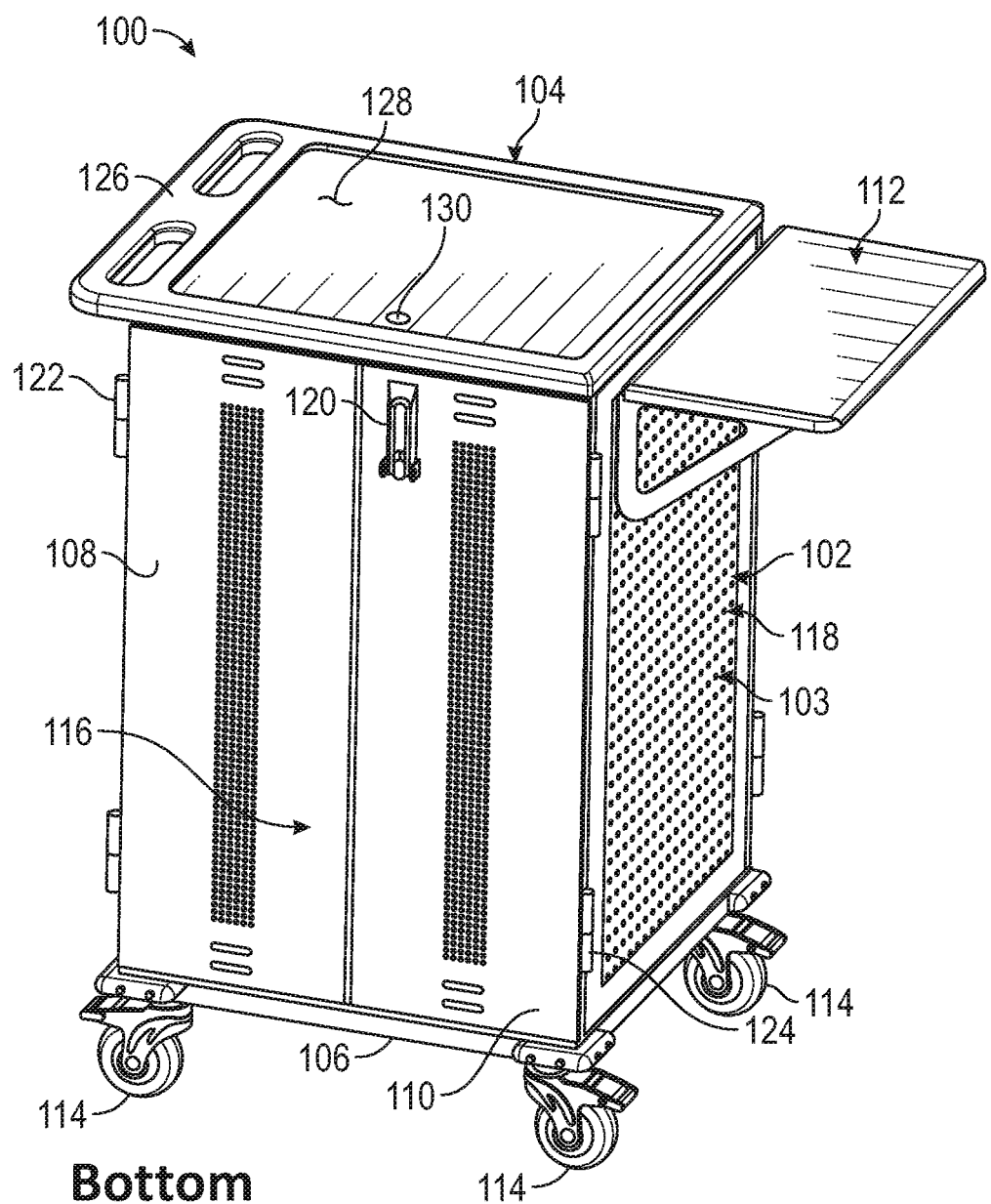
FIG. 1A illustrates a front isometric view of a storage and charging cart.
Figure 1B:
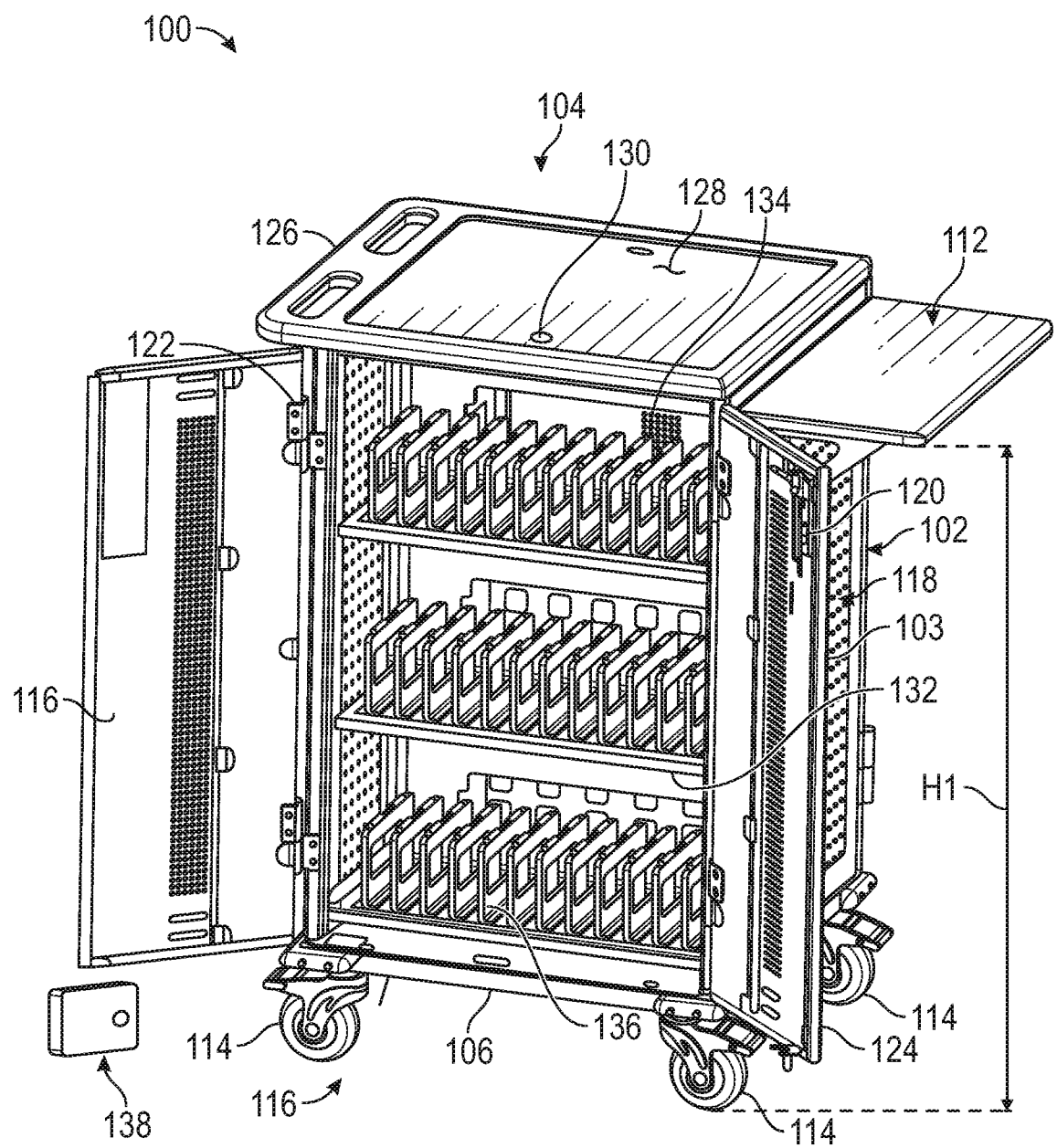
FIG. 1B illustrates a front isometric view of a storage and charging cart.

FIG. 1A illustrates a front isometric view of a storage and charging cart 100. FIG. 1B illustrates a front isometric view of the storage and charging cart 100. FIGS. 1A and 1B are discussed below concurrently.

The storage and charging cart 100 can include a frame 102, a panel 103, a top assembly 104, a base 106, a first door 108, a second door 110, a tray assembly 112, wheels 114, a first side 116, and a second side 118. The second door 110 can include a lock 120 and a second door hinge 124 and the first door 108 can include a first door hinge 122. The top assembly 104 can include a handle 126, a top surface 128, and a mounting grommet 130. The cart 100 can also include shelves 132, chargers 134, and dividers 136. Also shown in FIGS. 1A and 1B are orientation indicators Top and Bottom. Also shown in FIG. 1B is an electronic device 138 and height H1.

The frame 102 can be a rigid or semi-rigid body including structural members connected together to support the components of the cart 100. The components of the frame 102 and other components (such as the doors 108 and 112) can be comprised of materials such as one or more of metals, plastics, foams, elastomers, ceramics, composites, combinations thereof, or the like. The frame 102 can be connected to the base 106 at a bottom of the frame 102. The wheels 114 can be connected to the base 106 to support the frame 102 and the cart 100, generally. The wheels 114 can each be casters, wheels, or the like configured to allow the cart to be rolled. The wheels can be locking type. In some embodiments, casters can be removed to use the cart as a stationary charging and storage cabinet.

The panel 103 can be a rigid or semi-rigid panel secured to the frame 102. The panel 103 can include a body and plurality of apertures extending into the body. The panel 103 can be configured to support one or more components thereon, such as the tray assembly 112, in some examples, the panel 103 can be connected to the frame 102 through a hinge such that the panel 103 can operate as a door.

The top assembly 104 can be a support assembly connected to a top portion of the frame 102. The handle 126 can be sized and shaped to be grasped to move or position the cart 100. The top surface 128 can be a relatively flat surface configured to support and store objects thereon, such as electronic devices or books. The mounting grommet 130 can be a grommet connected to the top assembly 104. The mounting grommet 130 can be configured to connect a monitor to the top assembly 104 and therefore to the cart 100 (such as through the surface 128).

The first door 108 can be a door connected to the frame 102 through the first hinge 122. The first door 108 can be movable between an open and closed position. Similarly, the second door 110 can be a door connected to the frame 102 through the second hinge 124. The second door 110 can be movable between an open and closed position. The first door 108 and the second door 110 can be independently operable. The first lock 120 can be attached to the first door 110 and can be configured to interface with the frame 102 (or other component) to lock at least one of the first door 108 and the second door 110 in their closed positions. The first door 108 can optionally include a lock.

The tray assembly 112 can include a tray configured to support equipment thereon. The tray assembly 112 can be removably connectable to the panel 103 such that a height of the tray can be adjusted as desired along the panel 103. FIG. 1B shows that the tray assembly can be at a height H1, which can be selected by a user during installation of the tray assembly 112 on the panel 103.

The shelves 132 can be connected to and supported by the frame 102. The shelves 132 can be configured to support at least one electronic device thereon, such as the electronic device 138. The shelves 132 can also support the chargers 134 or the dividers 136. The chargers 134 can be wired or wireless chargers configured to deliver power electronic devices, such as the electronic device 138. The chargers 134 can each be coupled to one of the shelves 132. The dividers 136 can be physical dividers connected to the shelves and configured to physically separate electronic devices during charging or storage. Further details and operation of the storage and charging cart 100 are discussed below with respect to FIGS. 2A and 2B.

Figure 2A:
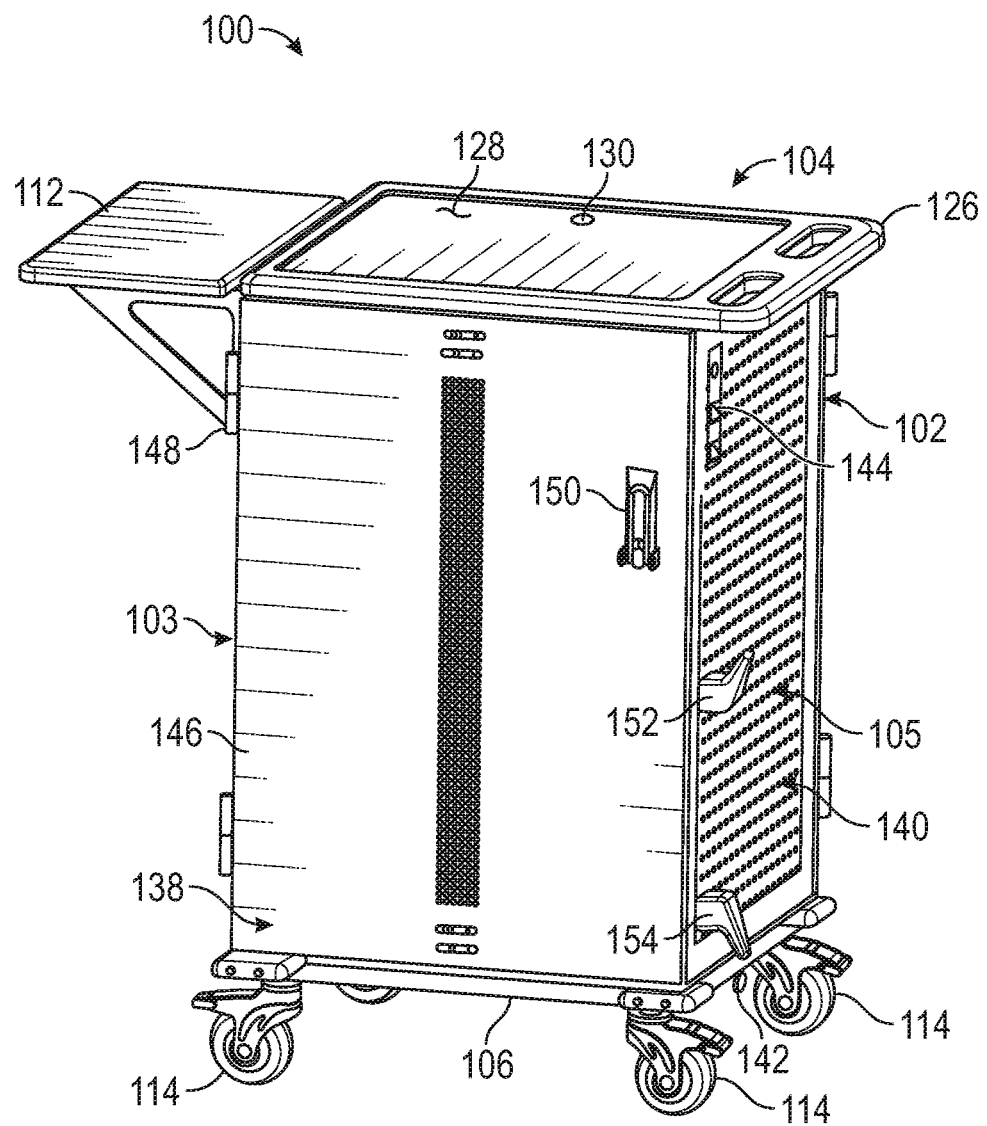
FIG. 2A illustrates a rear isometric view of a storage and charging cart.
Figure 2B:
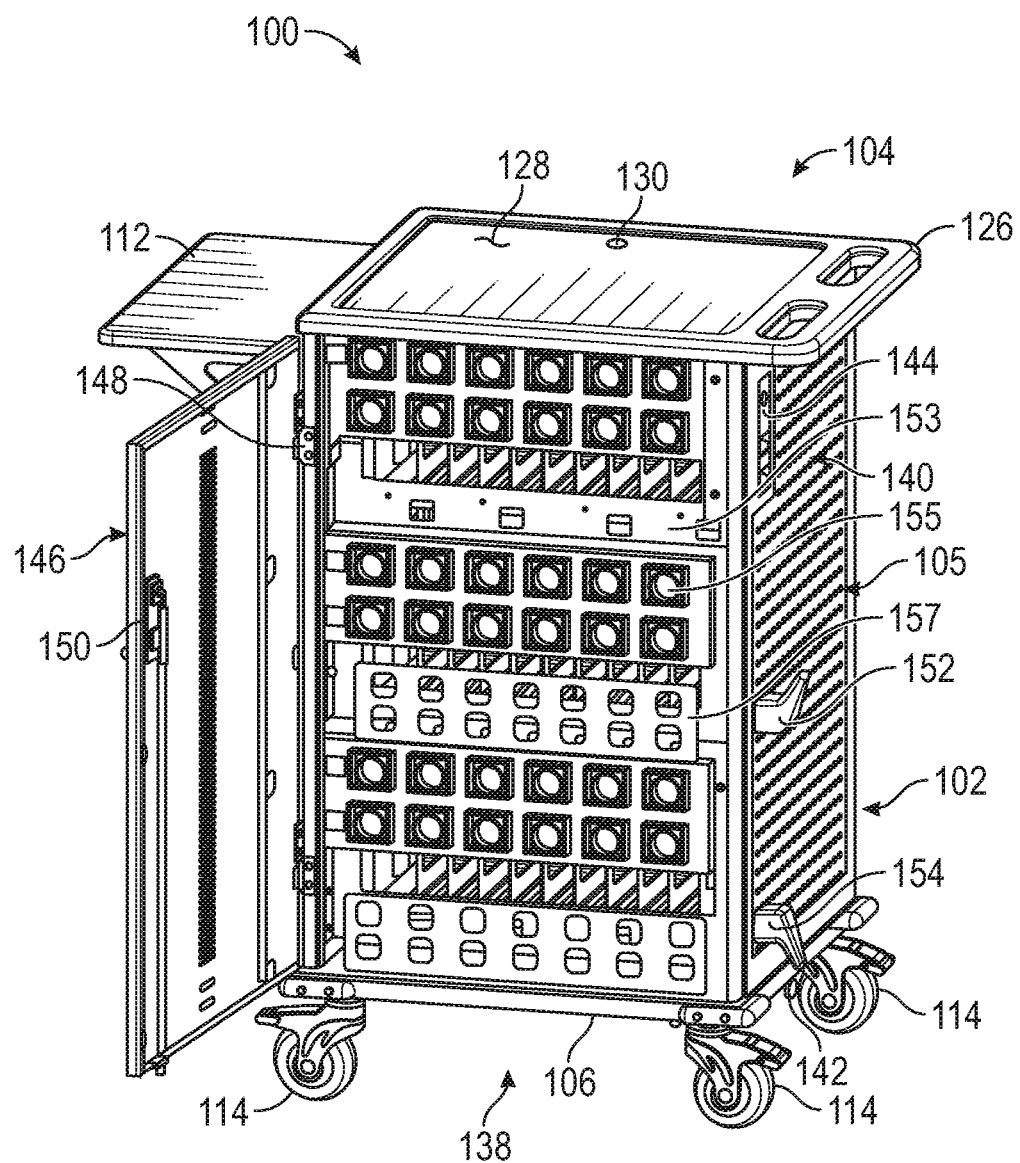
FIG. 2B illustrates a rear isometric view of a storage and charging cart.

FIG. 2A illustrates a rear isometric view of the storage and charging cart 100. FIG. 2B illustrates a rear isometric view of the storage and charging cart 100.

The storage and charging cart 100 of FIGS. 2A-2B can be consistent with the storage and charging cart 100 of FIGS. 1A-1B; FIGS. 2A-2B show additional details of the storage and charging cart 100. For example, FIGS. 2A and 2B show a third side 138 and fourth side 140 of the storage and charging cart 100. Also shown are a panel 105, a power inlet 142, a power outlet 144, a third door 146, a third hinge 148, a lock 150, and hooks 152 and 154. FIG. 2B also shows a cross panel 153, a power receptacle 155, and power adapter storage shelves 157.

The third side 138 can be a rear side opposing the first side 116 and the fourth side 140 can be a side opposing the second side 118. Together, the four sides can form a rectangular prism. The four sides can form other shapes in other examples. The panel 105 can be similar to the panel 103 in that it can be a rigid or semi-rigid panel secured to the frame 102. The panel 105 can include a body and plurality of apertures extending into the body. The panel 103 can be configured to support one or more components thereon, such as the tray assembly 112. In some examples, the panel 105 can be connected to the frame 102 through a hinge such that the panel 105 can operate as a door. Each of the panels 103 and 105 can include one or more apertures extending therethrough. The apertures can be any shape or size, as discussed in further detail in FIG. 4.

The hooks 152 and 154 can include features configured to support other components, such as an electrical cord. The hooks 152 and 154 can be connected to the panel 105 using extensions of the hooks 152 and 154 that can engage with apertures or bores of the panel 105. The hooks 152 and 154 can be placed in any location on the panel 105, as desired.

The power inlet 142 can be an electrical connector coupled to the frame 102 of the cart 100, such as to the base 106. The power inlet 142 can be configured to receive an electrical component for receipt of power for use by the cart 100. For example, the power inlet 142 can receive a plug, such as a bladed or pinned electrical plug for distribution of the power to charge devices within the cart 100. The power outlet 144 can be supported by the frame 102 of the cart 100 and can include one or more receptacles configured to deliver power to components connected thereto. The power outlet 144 can receive power from the power inlet 142.

The third door 146 can be connected to and supported by the frame 102 such as by the hinge 148, which can enable movement of the third door 146 between an open and closed position. The lock 150 can be connected to the door 146 and can be engageable with the frame 102. The lock 150 can be operable to lock the third door 146 in a closed position, as shown in FIG. 2A.

The cross panel 153 can be connected to the frame 102 and can be configured to support components of the cart 100, such as the shelves 132. The power receptacles 155 can be supported by the frame 102 such as through the cross panel 153 or the shelves 132.

The power receptacles 155 can be wired or wireless chargers configured to deliver power to electronic devices, such as the electronic device 138. The power receptacles 155 can receive power from the power inlet 142 and can be configured to deliver power to electrical devices within the cart 100. The power receptacles 155 can also be configured to connect to a data port of the electronic devices, such as the electronic device 138, for exchange of information between the devices and another device or between the devices. Optionally, the electronic device 138 can connect wirelessly to other devices (such as a wireless router) for exchange of data or syncing.

The power adapter storage shelves 157 can be connected to and supported by the frame 102 and can be configured to support power adaptors connected thereto where the power adaptors can receive power from the power input 142 and can, for example, transform the power for the power receptacles 155.

In operation of some examples, when the lock 120 is unlocked, one or more of the first door 108 and the second door 110 can be opened for access to inside the cart 100. The electronic device 138 can be inserted between dividers 136 onto a shelf 132 (shown in FIG. 1B) and can be connected to a power receptacle 155 (shown in FIG. 2B). The power input 142 (FIG. 2B) can receive power for distribution to the receptacles 155 for charging of the device 138 (or other devices within the cart 100). During charging (or communication) the doors 108 and 110 can be moved to a closed position and optionally locked using the lock 120. The tray 112 can be adjusted to a height as desired for support of components, such as a keyboard, and the top surface 128 can receive components, such as a monitor, thereon. Such components can be powered using the power outlets 144. The third door 138 can be opened for access to the power adaptors supported by the storage shelf 157 and can be closed and locked using the lock 150.

When the electronic devices are collected within the cart 100, the power input 142 can be disconnected and the cord can be stored using the hooks 152 and 154. The cart 100 can then be pushed to move the cart 100 to another location, where the power 142 can be reconnected, such as for overnight storage and charging of the devices (such as the electronic device 138). When it is desired to retrieve the device 138, the lock 120 can be unlocked and one or more of the doors 108 and 110 can be opened for access to the stored electronic device 138.

Figure 3:
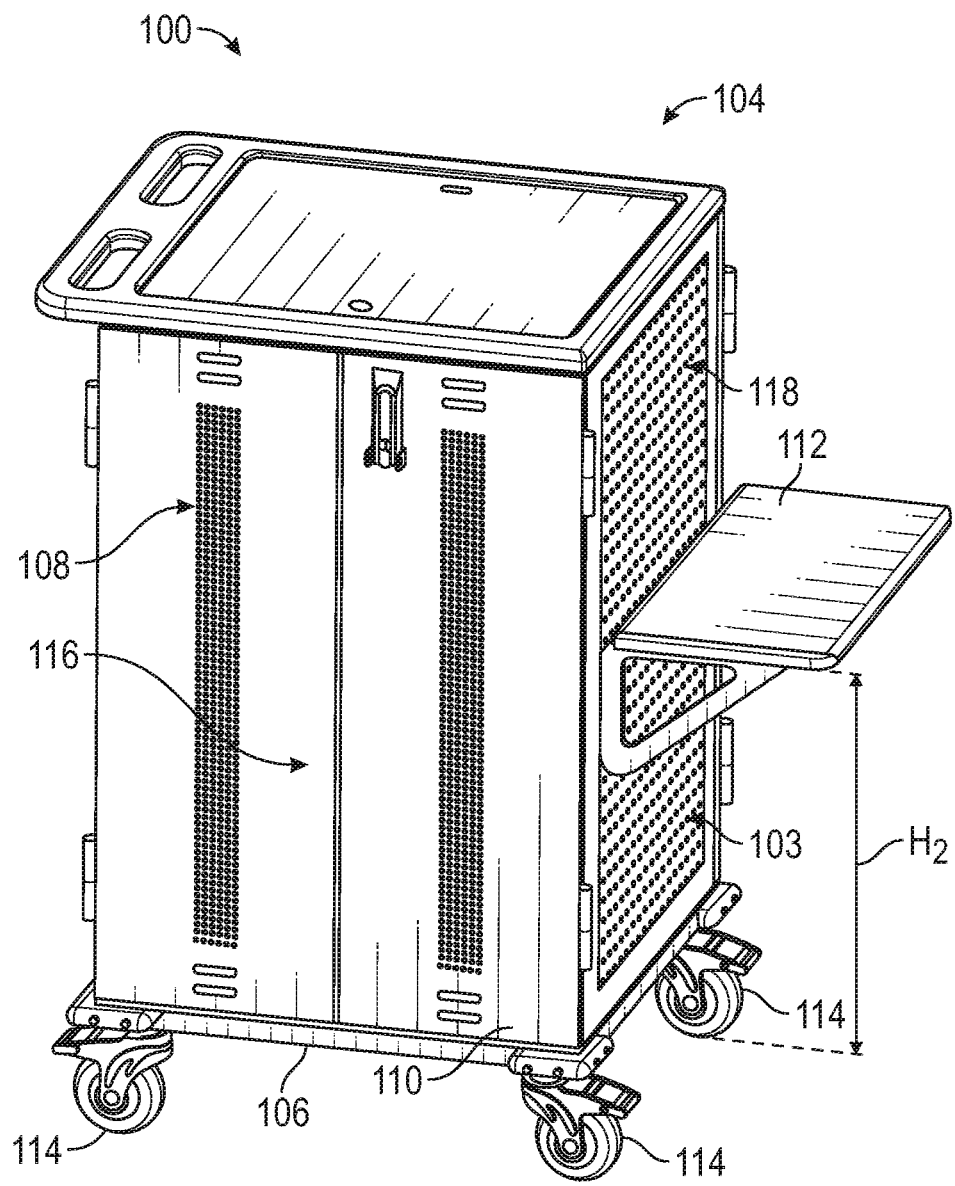
FIG. 3 illustrates a front isometric view of a storage and charging cart.

FIG. 3 illustrates a front isometric view of the storage and charging cart 100. The storage and charging cart 100 of FIG. 3 can be consistent with the storage and charging cart 100 of FIGS. 1A-2B discussed above. FIG. 3 shows that the tray assembly 112 of the storage and charging cart 100 can be connected to the panel 103 at a lower height, height H2. The tray assembly 112 can be connected to the panel 103 at any height allowable by the panel 103 and the cart 100.

FIG. 4 illustrates a plan view of a plurality of holes for a panel 400 of a storage and charging cart. For example, the holes of FIG. 4 can be of the panel 103 or the panel 105 of the storage cart 100.

The panel 400 can include a body 401 and rows 402, 404, 406, 408, 410, 412, 414, and 416. The body 401 can be a sheet, plate, or the like including a plurality of apertures or bores extending therein or therethrough. The row 402 can include first hole or aperture type 418, which can be a substantially round or circular hole or bore. The row 404 can include an elongate bore 420 or aperture which can have a vertical stadium shape.

The row 406 can be a keyhole shaped aperture 422. The keyhole apertures 422 can include an upper bore 430 defining an upper diameter D1. The upper bore can be a round or circular bore. The keyhole apertures 422 can also include a slot 432 connected to a bottom portion of the upper bore 430, where the slot 432 can be a partial elongated bore, such as a partial stadium-shaped bore. The slot 432 can define a size a width W2 (which can be a diameter in some examples) that can be smaller than the upper diameter D1 of the upper bore 430.

The row 408 can include an elongate bore 424 or aperture such as a horizontal stadium shape. The row 410 can include a combination of bore or aperture shapes, such as the round bore 418, the vertical stadium bore 420, and the horizontal stadium bore 424. Similarly, the row 412 can include multiple bore shapes.

The row 414 can include bores 426 having a diagonal racetrack shape and the row 416 can include bores 428 having a diagonal racetrack shape oriented in a different direction, such as an opposite direction, to the bores 426. Each of the bores or apertures of the panel 400 can be configured to receive an extension or projection of a component (such as a tray assembly) to secure the component to the panel 400, as discussed in further detail below.

Figure 5A:
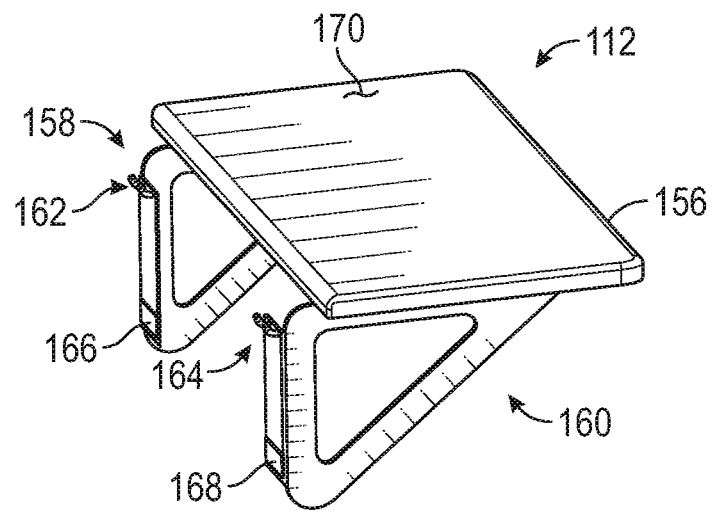
FIG. 5A illustrates an isometric view of a tray assembly of a storage and charging cart.
Figure 5B:
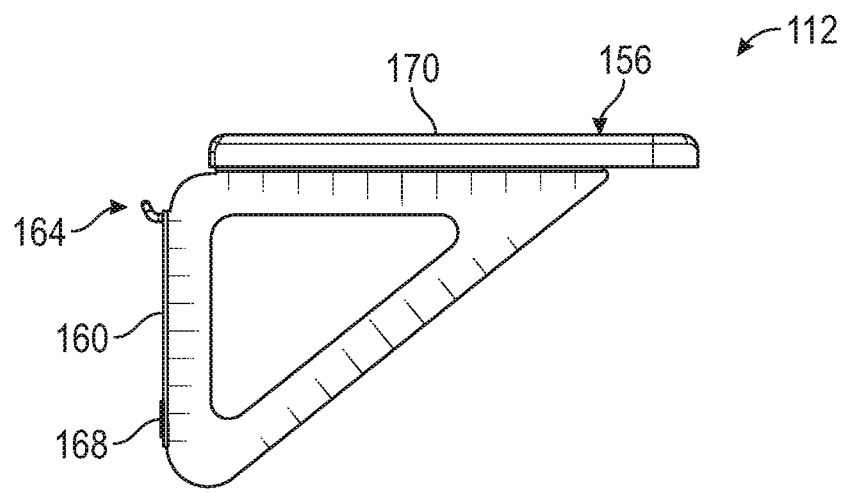
FIG. 5B illustrates a side view of a tray assembly of a storage and charging cart.

FIG. 5A illustrates an isometric view of a tray assembly 112 of a storage and charging cart. FIG. 5B illustrates a side view of the tray assembly 112 of a storage and charging cart.

The tray assembly 112 can include a tray 156, a first support bracket 158, a second support bracket 160, a first set of extensions (hooks) 162, a second set of extensions (hooks) 164, a first spacer 166, and a second spacer 168. The tray 156 can include a top surface 170.

Generally, the tray assembly 112 can be removably connectable to the panel 103 or 105, as discussed above. The tray 156 can be a rigid or semi-rigid member configured to support equipment on the top surface 170. The first support bracket 158 can be coupled to the tray 156 and can be configured to engage the panel (such as the panel 103) to support the tray assembly 112. Similarly, the second support bracket 160 can be coupled to the tray 156 and can be configured to engage the panel 103 to, together with the first support bracket 158, support the tray assembly 112 on the panel 103.

The first set of extensions 162 can be hooks or projections extending away from the first support bracket 158 and away from the tray 112. The extensions 162 can insertable into any aperture of the plurality of apertures of the panel 103 to connect the first support bracket 158 (and therefore the tray assembly 112) to the body of the panel. The extensions 162 can be upturned (such as upturned hooks) for securing of the tray 112 to the apertures of the panel 102. Such upturned extensions 162 can require that the tray assembly 112 is tilted with respect to the panel 103 to remove the extensions 162 from the apertures.

Similarly, the second set of extensions 164 can be hooks or projections extending away from the second support bracket 160 and away from the tray 112. The second set of extensions 164 can insertable into any aperture of the plurality of apertures of the panel 103 to connect the second support bracket 160 (and therefore the tray assembly 112) to the body of the panel. The extensions 164 can be upturned (such as upturned hooks) for securing of the tray 112 to the apertures of the panel 102.

The first spacer 166 can be connected to the first support bracket 158 and the second spacer 168 can be connected to the second support bracket 160. The spacers 166 and 168 can be engageable with the panel (such as when the tray assembly 112 is secured to the panel 103) to orient the tray 156 such that the surface 170 is in a level position when the tray assembly 112 is secured to the panel 103 by the extension (or extensions) 162 and 164.

The extensions 162 and 164 can each include one or more extensions, such as 1, 2, 3, 4, 5, 6, 7, 8, 9, 10, or more extensions. Each extension can be configured to be insertable into any aperture of the plurality of apertures of the panel 103 to connect the tray assembly 112 to the body of the panel.

Figure 6A:
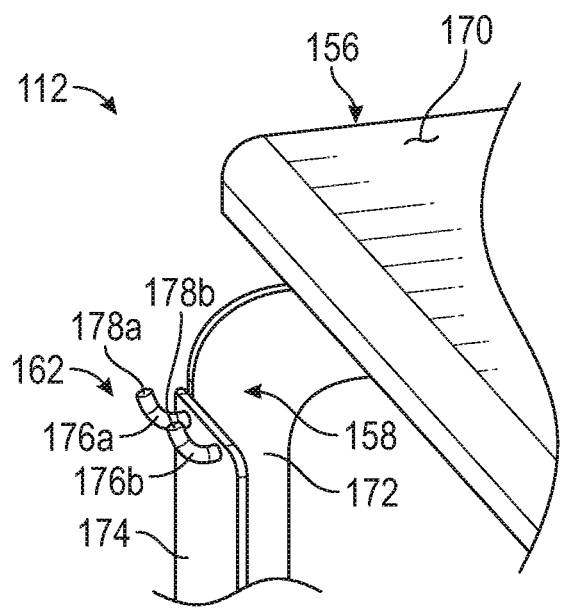
FIG. 6A illustrates an isometric view of a portion of a tray assembly.

FIG. 6A illustrates an isometric view of a portion of the tray assembly 112. The tray assembly 112 of FIG. 6A can be consistent with the tray assembly 112 discussed above; FIG. 6A shows further details of the tray assembly 112. For example, FIG. 6A shows that the first support bracket 158 can include a tray support 172 and a support plate 174. The tray support 172 can be generally triangular in shape, and can have other shapes in other examples. The support plate 174 can be connected to the tray support 172 and can be configured to extend orthogonally to the tray support 172 and parallel to a face of a panel (when the tray assembly 112 is attached to a panel, such as the panel 103). For example; the support plate 174 can be configured to engage a panel 103 when the tray assembly 112 is secured to the panel 103 to help distribute a load of the tray assembly 112 and components supported thereby on the panel 103.

FIG. 6A also shows that the extensions 162 can include a first extension 176a and a second extension 176b, which can each be upturned hooks extending away from the support plate 174 and away from the tray 156 and extending upward when the tray 156 is oriented in a level position. The second support bracket 160 can be similarly configured.

In operation of some examples, an outer edge (away from the support brackets 158 and 160) of the tray assembly 112 can be tilted upward with respect to the panel such that tips 178a and 178b can be inserted into apertures of the panel 103. Tips of extensions of the second support bracket 160 can also be inserted into apertures of the panel 103. Once the tips 178a and 178b are inserted into apertures, the tray assembly 112 can be lowered (or tilted downward) until the support plate 174 (and a support plate of the second support bracket 160) or the spacers 166 and 168 engage the panel 103. When lowered, the extensions 176a and 176b can extend through the apertures laterally and upward. The extensions 176 can therefore contact a pack portion of the panel 103 to help limit downward movement of the tray assembly 112 with respect to the panel 103 and can help limit movement of the tray assembly 112 laterally away from the panel 103, which can help prevent the tray assembly 112 from disengaging the panel 103.

Figure 6B:
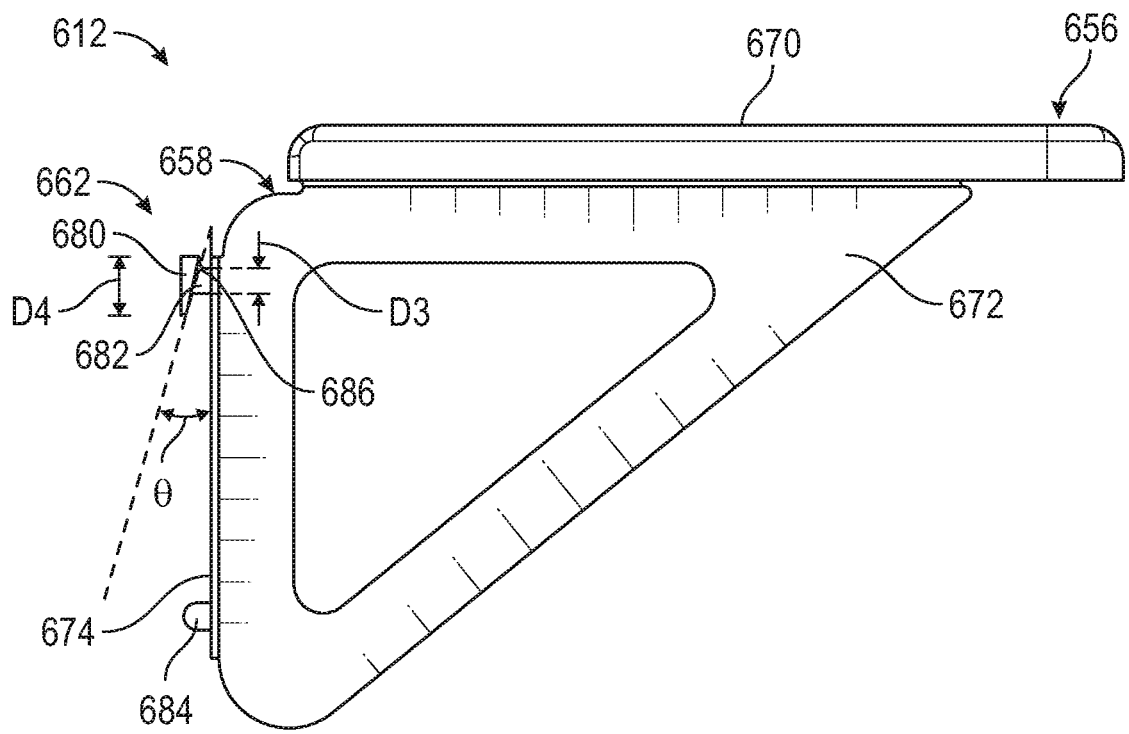
FIG. 6B illustrates a side view of a tray assembly.

FIG. 6B illustrates a side view of a tray assembly 612. The tray assembly 612 can be similar to the tray assembly 112 discussed above except that the extensions 662 can each include a head 680 and a shaft 682 and the support plate 674 can include a locator pin 684. Any of the carts discussed above or below can be modified to include such extensions or locator pins.

The shaft 682 can be connected to the support plate 674 of the support bracket 658. The shaft 682 can extend away from the support bracket 658 and can have a shaft diameter D3. The head 680 can be connected to the shaft 682 and the head 680 can have a head diameter D4; the head diameter D4 can be larger than the shaft diameter D3. The head 680 can also include a distal surface 686 that can be configured to engage a proximal surface of the panel to limit movement of the extension 662 and the tray 612 with respect to the panel. In some examples, the distal surface 686 can be formed at an angle θ with respect to the support plate 674 such that the head 680 (and the tray 612) can be tilted upward (such as at the angle θ) to insert the head 680 into an aperture of the panel. That is, the angled distal surface 686 of the head 680 can be inserted into an aperture when the tray 612 is positioned at a non-perpendicular angle with respect to the panel.

As discussed above with respect to FIG. 4, the panel 400 can include the aperture 422 that can be a key-hole aperture including the upper bore 430 including the upper diameter D1 and the slot 432 connected to a bottom portion of the upper bore 430, where the slot has a width W2, where the width W2 can be smaller than the upper diameter D1. Such a key-hole aperture can be configured to receive the shaft 682 and the head 680 of the extension 662 therein to secure the tray 612 to the panel.

More specifically, the upper diameter D1 can be larger than the head diameter D4 such that the upper bore 430 can receive the head 680 therein and the shaft 682 can extend into the upper bore 430. The slot width (or size) W2 432 can be smaller than the head diameter D4 and can be larger than the shaft diameter D3 but smaller than the head diameter D3. This can allow the shaft 682 to be moved from the upper bore 430 into the slot 432 but can preclude (or limit) the head 630 from moving into the slot, such that the head 630 must be fully inserted into the upper bore 430 to move the shaft 632 into the slot 431. Once the shaft 632 is inserted into the slot 432, the distal surface 686 of the head 680 can engage a proximal surface of the panel (such as the proximal surface 771 shown in FIG. 7B) to limit movement of the extension 662 and the tray 612 with respect to the panel.

The extension 662 can be removed from the slot by lifting the tray assembly 612 vertically to position the shaft 682 in the upper bore 430 and to align the head 680 with the upper bore 430. The tray assembly 612 can then be translated outward from the cart to pass the head 680 through the upper bore 430 to remove the extension 662 from the aperture 422. Such a process can be repeated to position the tray 612 in any height allowed by the panel.

The locator pin 684 can be a pin, extension, boss, or the like connected to the support bracket 658, such as via the support plate 674. The locator pin 684 can be located away from the extension 662, such as near a bottom portion of the support plate 674. The locator pin 684 can be insertable into any aperture of the plurality of apertures, which can help to limit vertical and horizontal movement of the tray assembly with respect to the panel. The locator pin 684 can also help to require that the tray 612 is tilted with respect to the panel (such as at the angle θ) before the extension 662 can be removed from the aperture 422 by contacting the panel when the tray assembly 612 is translated vertically with respect to the panel without tilting the tray assembly 612 to remove the locator pin 684 from the aperture of the panel.

A second support bracket can also include a locator pin that can be connected to the second support bracket away from the second extension. The second locator pin can also be insertable into any aperture of the plurality of apertures to, together with the locator pin 684, limit vertical and horizontal movement of the tray assembly 612 with respect to the panel when the tray 656 is level (when the tray assembly 612) is not tilted.

Figure 7A:
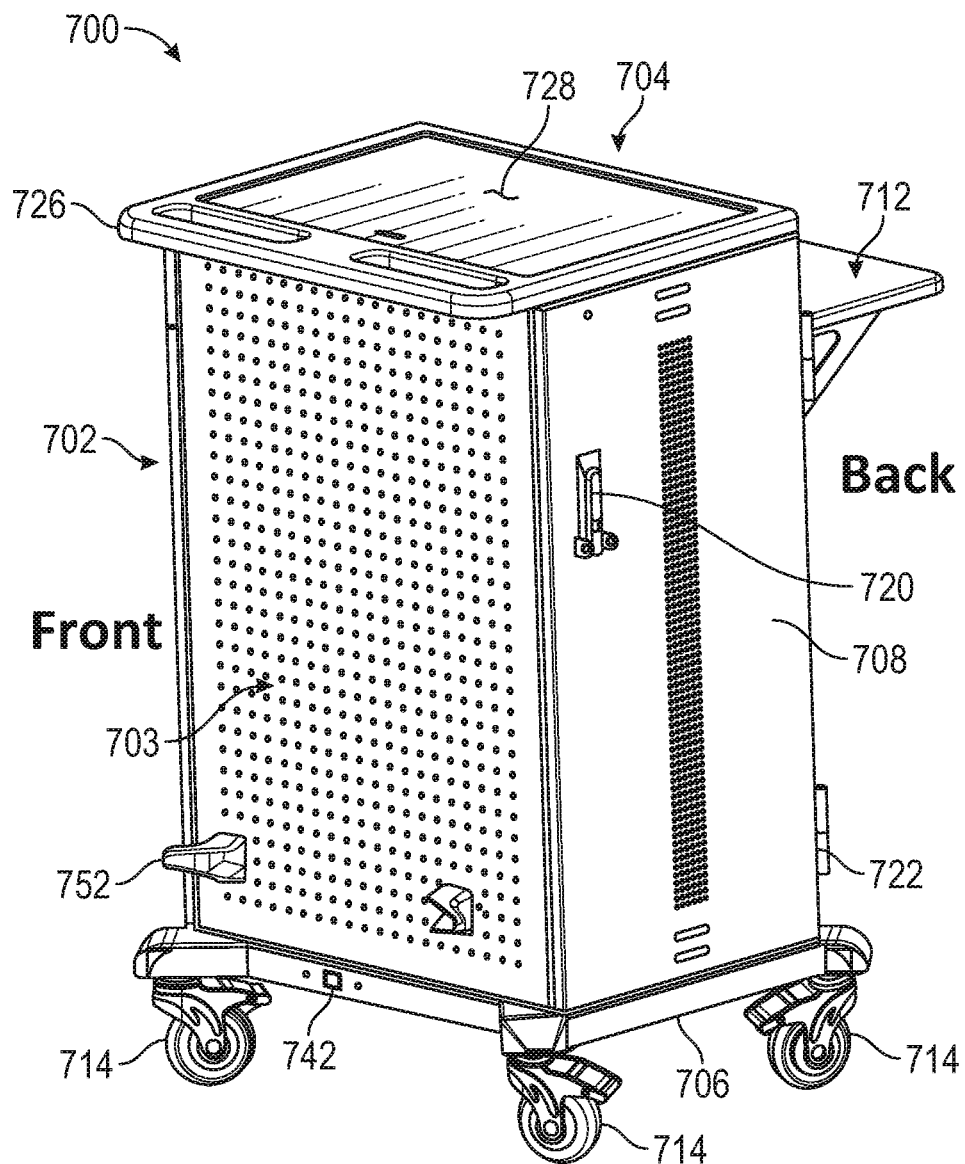
FIG. 7A illustrates a front isometric view of a storage and charging cart.
Figure 7B:
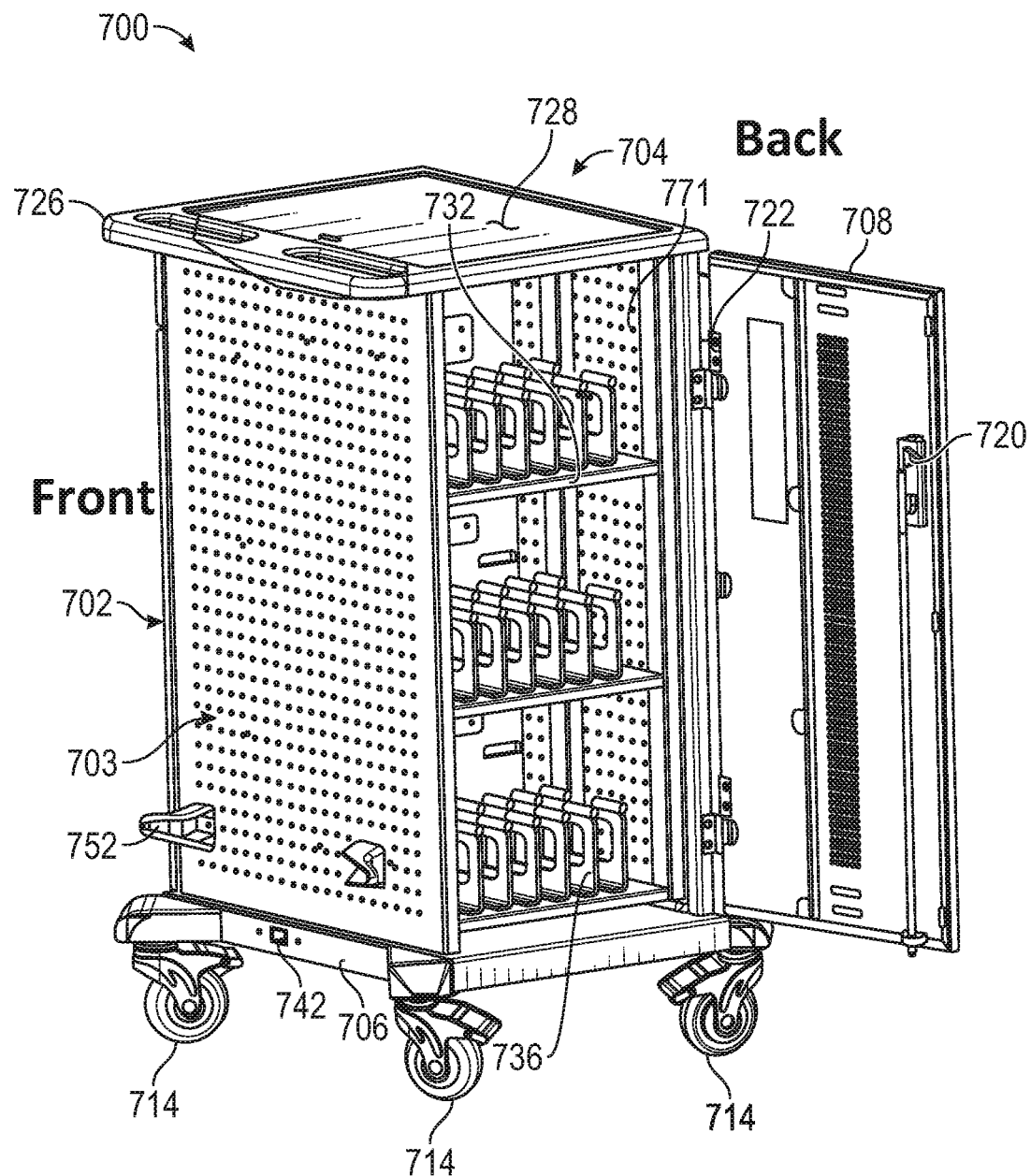
FIG. 7B illustrates a front isometric view of a storage and charging cart.
Figure 8A:
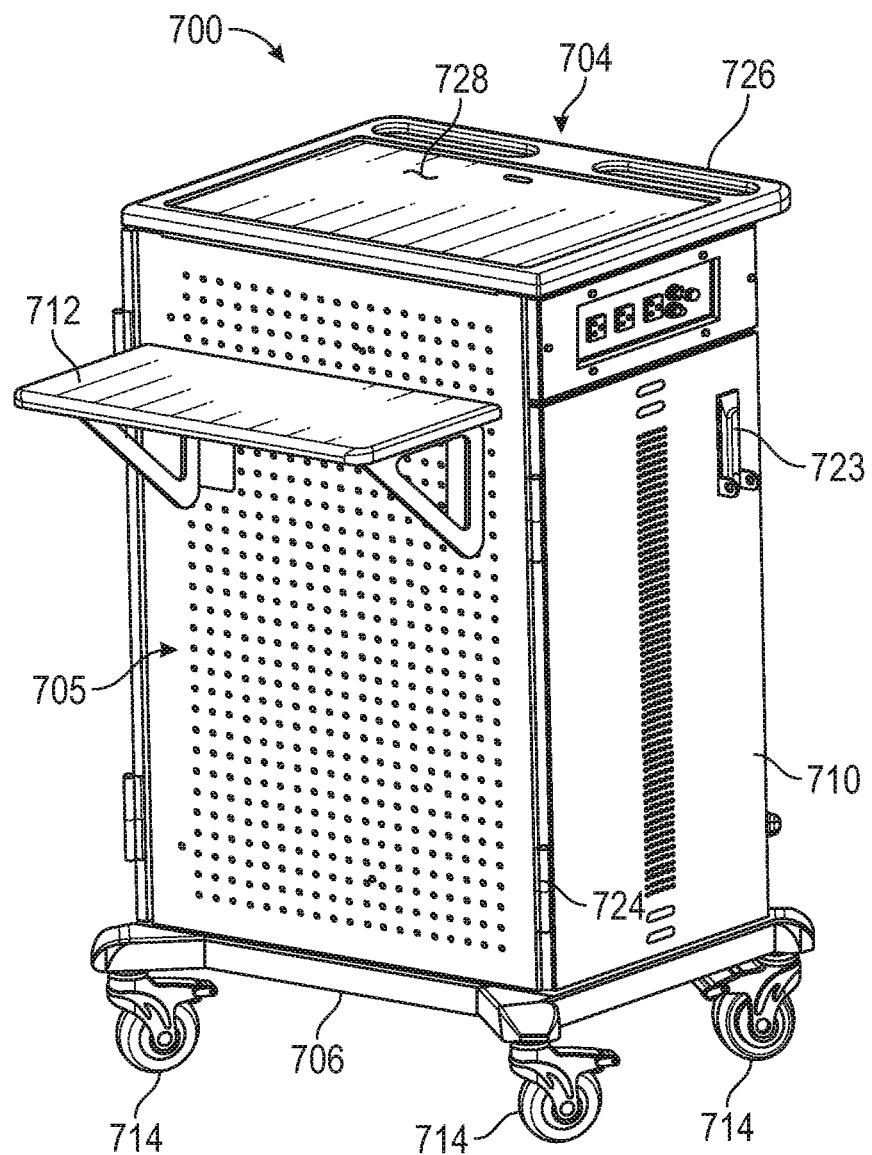
FIG. 8A illustrates a rear isometric view of a storage and charging cart.
Figure 8B:
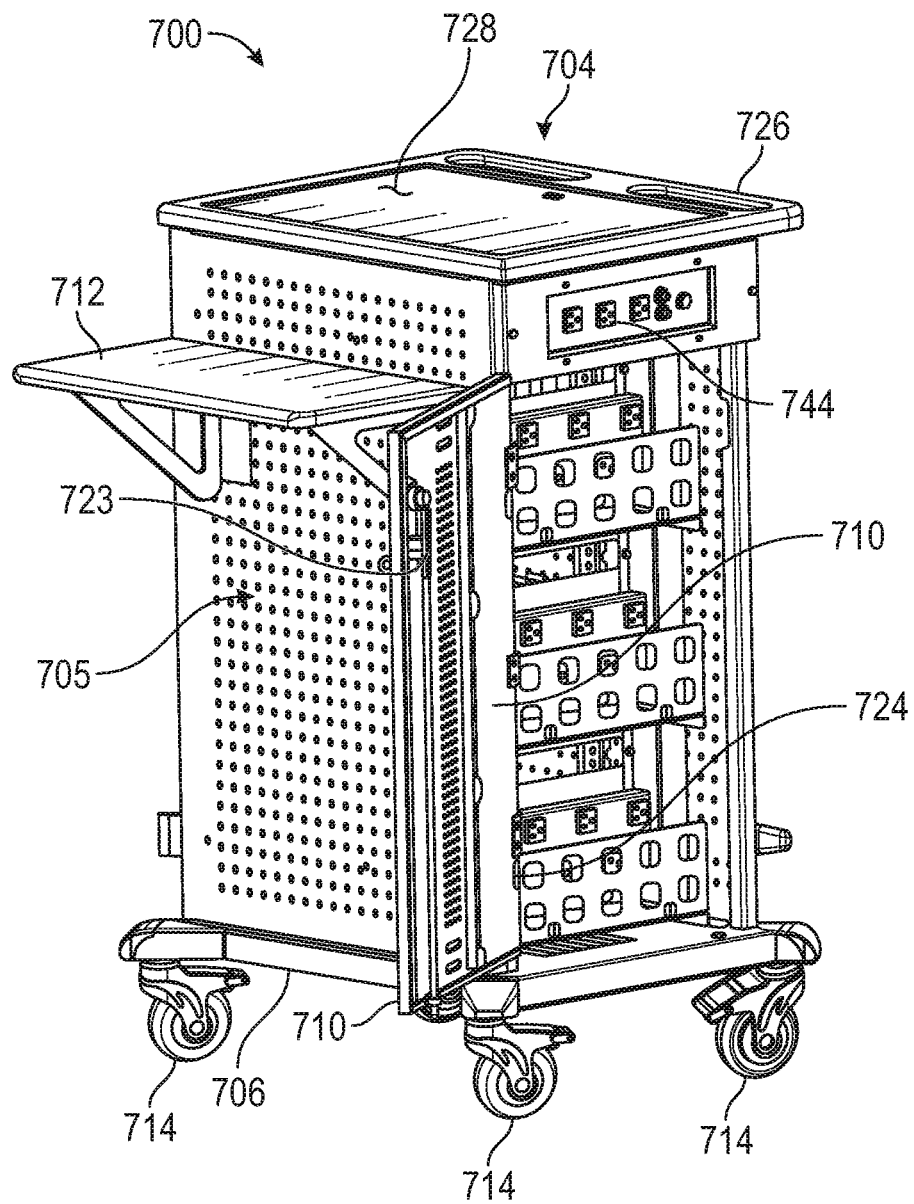
FIG. 8B illustrates a rear isometric view of a storage and charging cart.

FIG. 7A illustrates a front isometric view of a storage and charging cart 700. FIG. 7B illustrates a front isometric view of the storage and charging cart 700. FIG. 8A illustrates a rear isometric view of the storage and charging cart 7000. FIG. 8B illustrates a rear isometric view of the storage and charging cart 700. FIGS. 7A-8B are discussed below concurrently.

The storage and charging cart 700 can include a frame 702, a top assembly 704, a base 706, a first door 708, a second door 710, a tray assembly 712, and wheels 714. The first door 708 can include a first lock 720 and a first door hinge 721. The second door 710 can include a second lock 723, and a second door hinge 724. The top assembly 704 can include a handle 726 and a top surface 728. The cart 700 can also include shelves 732, dividers 736, a power inlet 742, and hooks 752. Also shown in FIG. 7A are orientation indicators Front and Back. The storage and charging cart 700 can be similar to the storage and charging cart 100 discussed above, except that the doors 708 and 710 can be positioned on sides of the storage and charging cart 700.

Figure 9A:
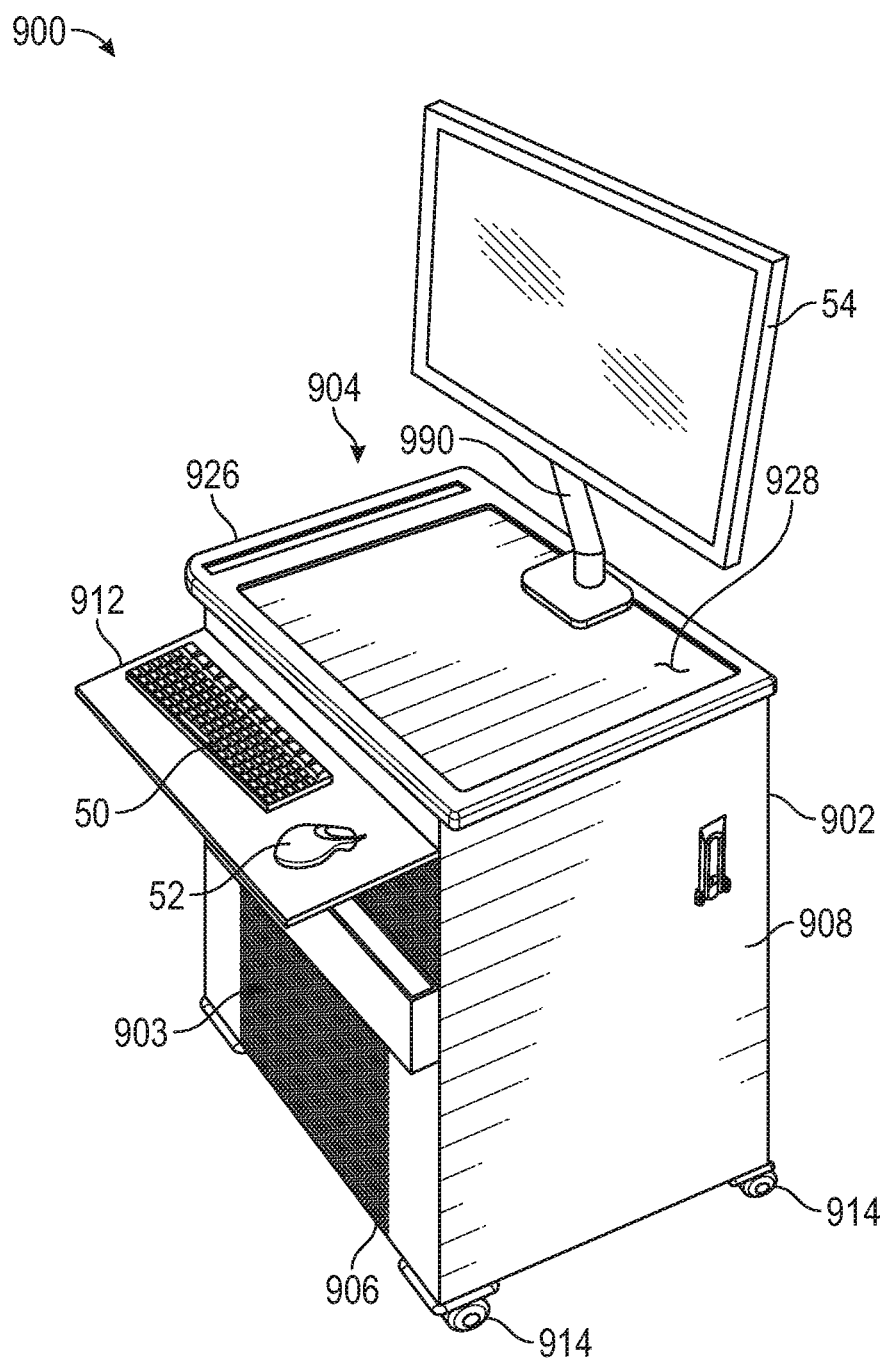
FIG. 9A illustrates a front isometric view of a storage and charging cart.
Figure 9B:
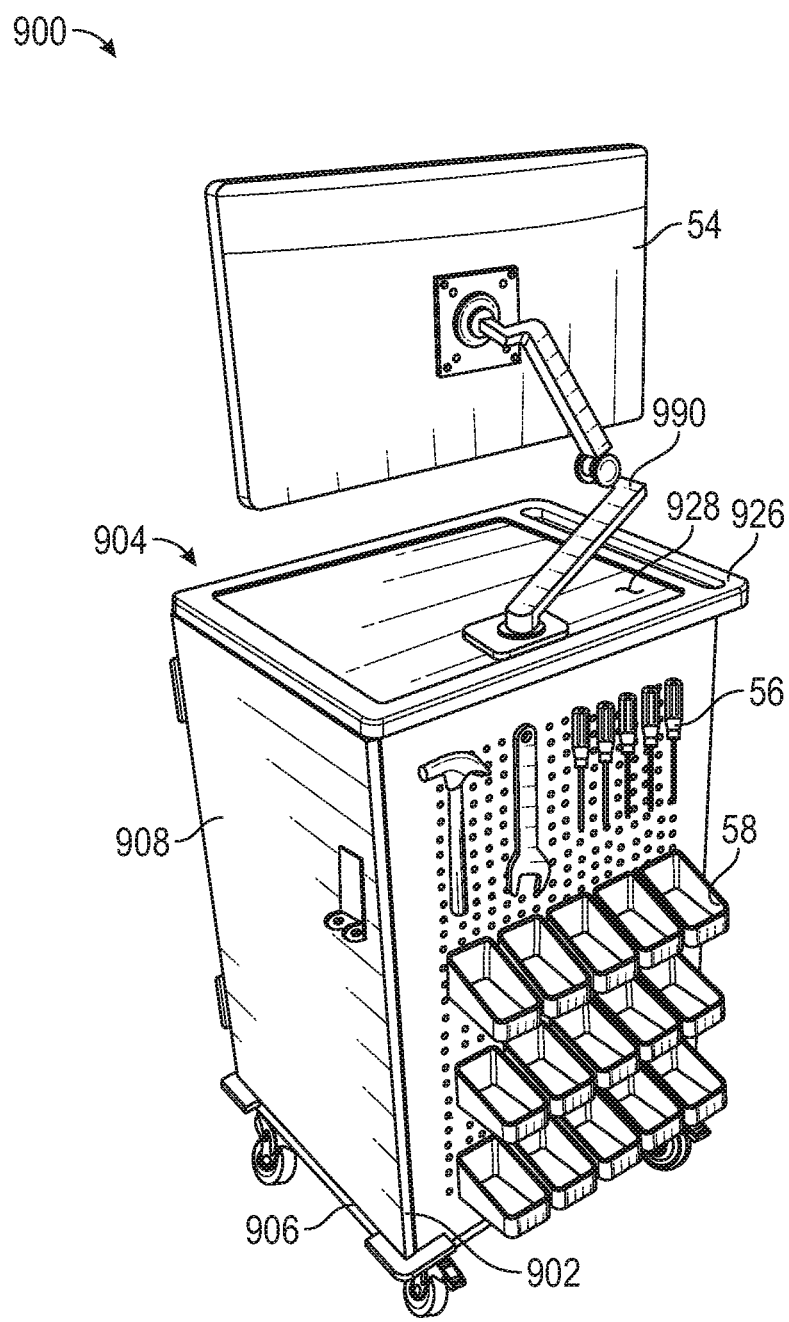
FIG. 9B illustrates a rear isometric view of a storage and charging cart.

FIG. 9A illustrates a front isometric view of a storage and charging cart. FIG. 9B illustrates a rear isometric view of a storage and charging cart. FIGS. 9A and 9B are discussed below concurrently.

The storage and charging cart 900 can include a frame 902, panels 903 and 905, a top assembly 904, a base 906, a door 908, a tray assembly 912, and wheels 914. The top assembly 904 can include a handle 926 and a top surface 928.

The storage and charging cart 900 can be similar to the storage and charging cart 100 discussed above, except that the tray assembly 912 is shown as supporting a keyboard 50 and a mouse 52 (FIG. 9A). Also, FIGS. 9A and 9B show how the top assembly 904 can support an arm 990, which can support a monitor 54. FIG. 9B also shows that the panel 905 can support tools 56 and containers 58 thereon. Other storage and charging carts discussed herein can be modified to include the features of the storage and charging cart 900.

Figure 10:
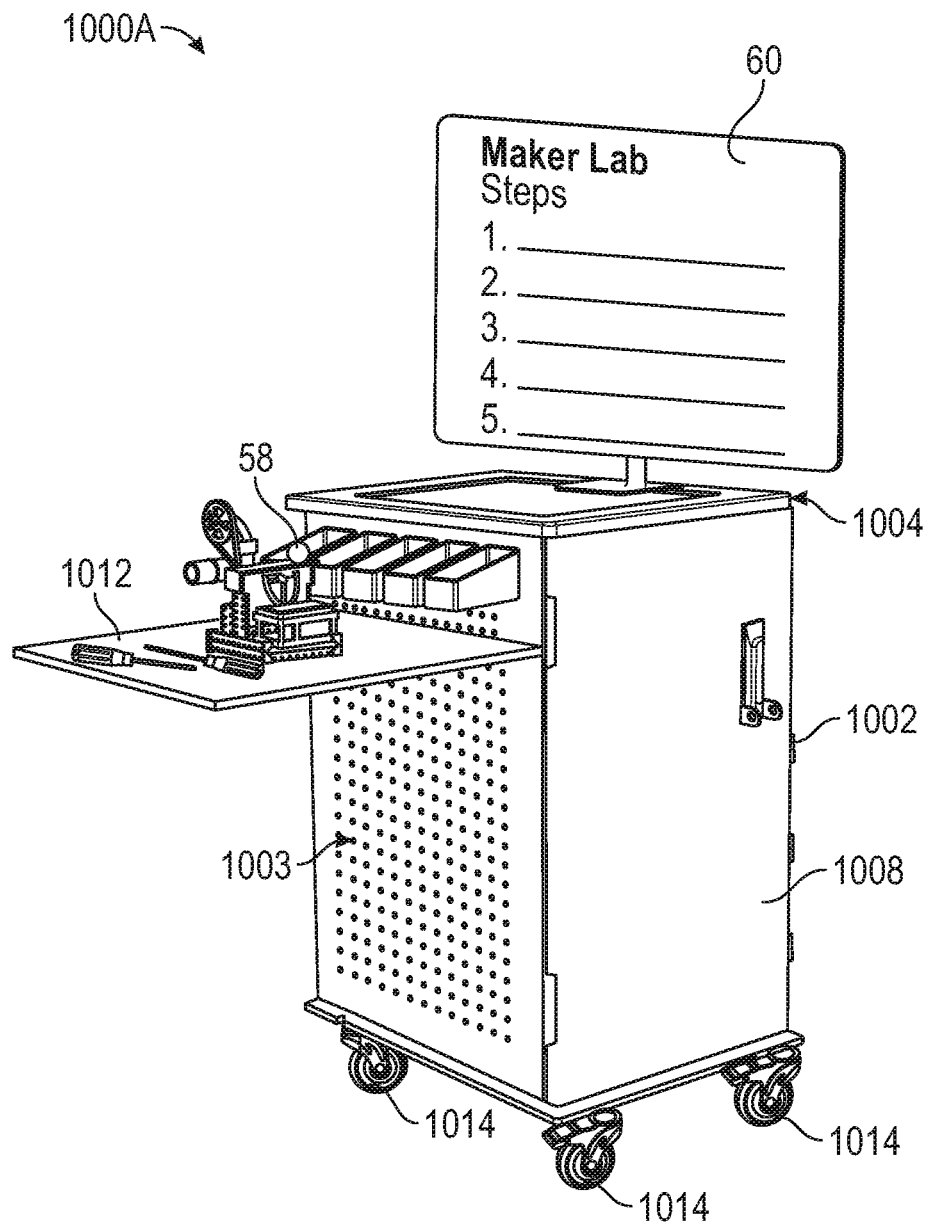
FIG. 10 illustrates a front isometric view of a storage and charging cart.
Figure 11:
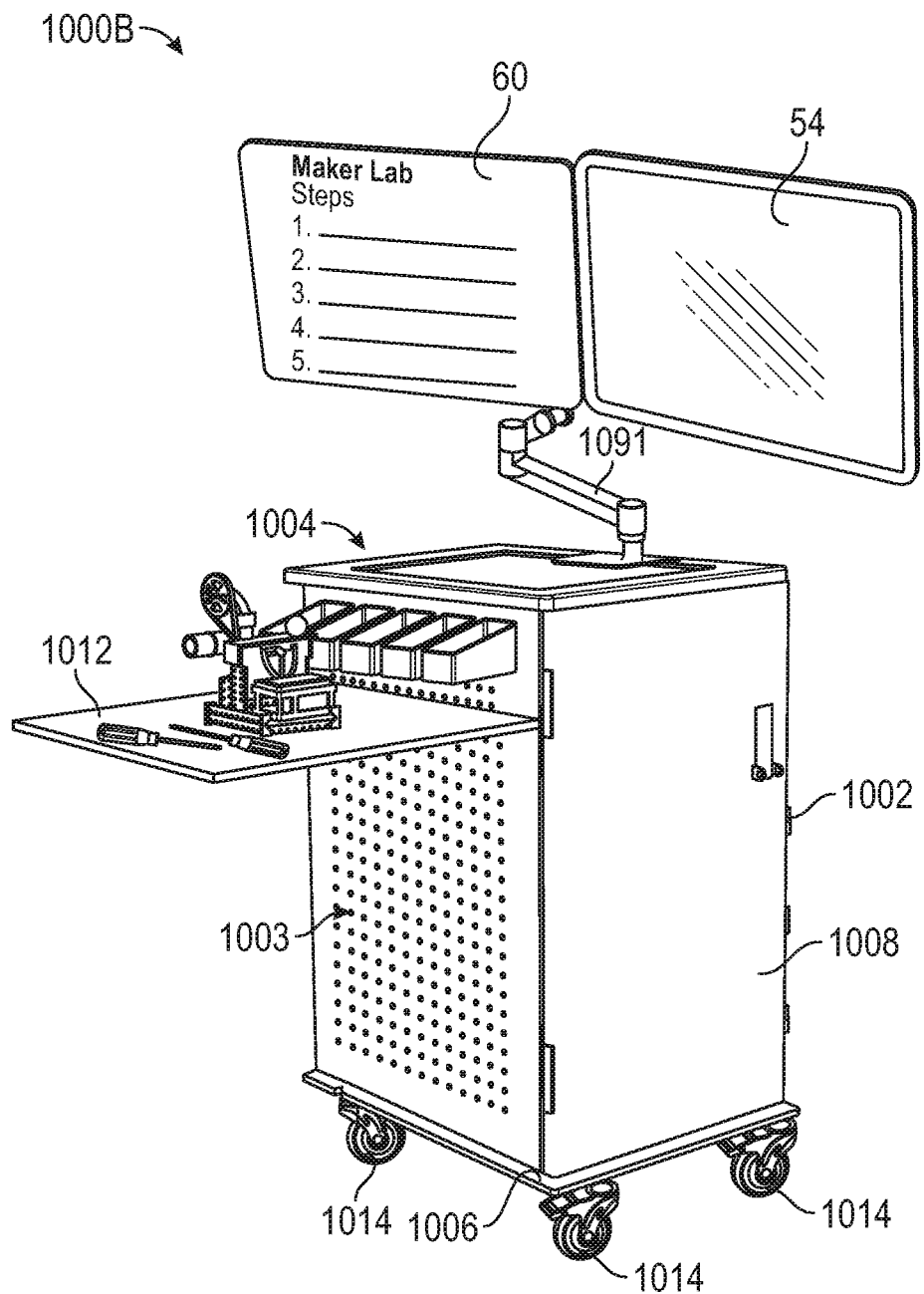
FIG. 11 illustrates a front isometric view of a storage and charging cart.

FIG. 10 illustrates a front isometric view of a storage and charging cart 1000A. FIG. 11 illustrates a front isometric view of the storage and charging cart 1000B. FIGS. 10 and 11 are discussed below concurrently. The storage and charging cart 1000 can include a frame 1002, a panel 1003, a top assembly 1004, a base 1006, a door 1008, a tray assembly 1012, and wheels 1014.

The storage and charging cart 1000A can be similar to the storage and charging carts discussed above, except that the tray assembly 1012 can be larger such as to form a workstation thereon, such as for use of tools on a workpiece. Also, FIG. 10 shows how the arm 1090 can support a drawing board 60 and FIG. 11 shows how the cart 1000B can include an arm 1091 that can support both a monitor 54 and a drawing board 60. Other storage and charging carts discussed herein can be modified to include the features of the storage and charging cart 1000A or the storage and charging cart 1000B.

Figure 12:
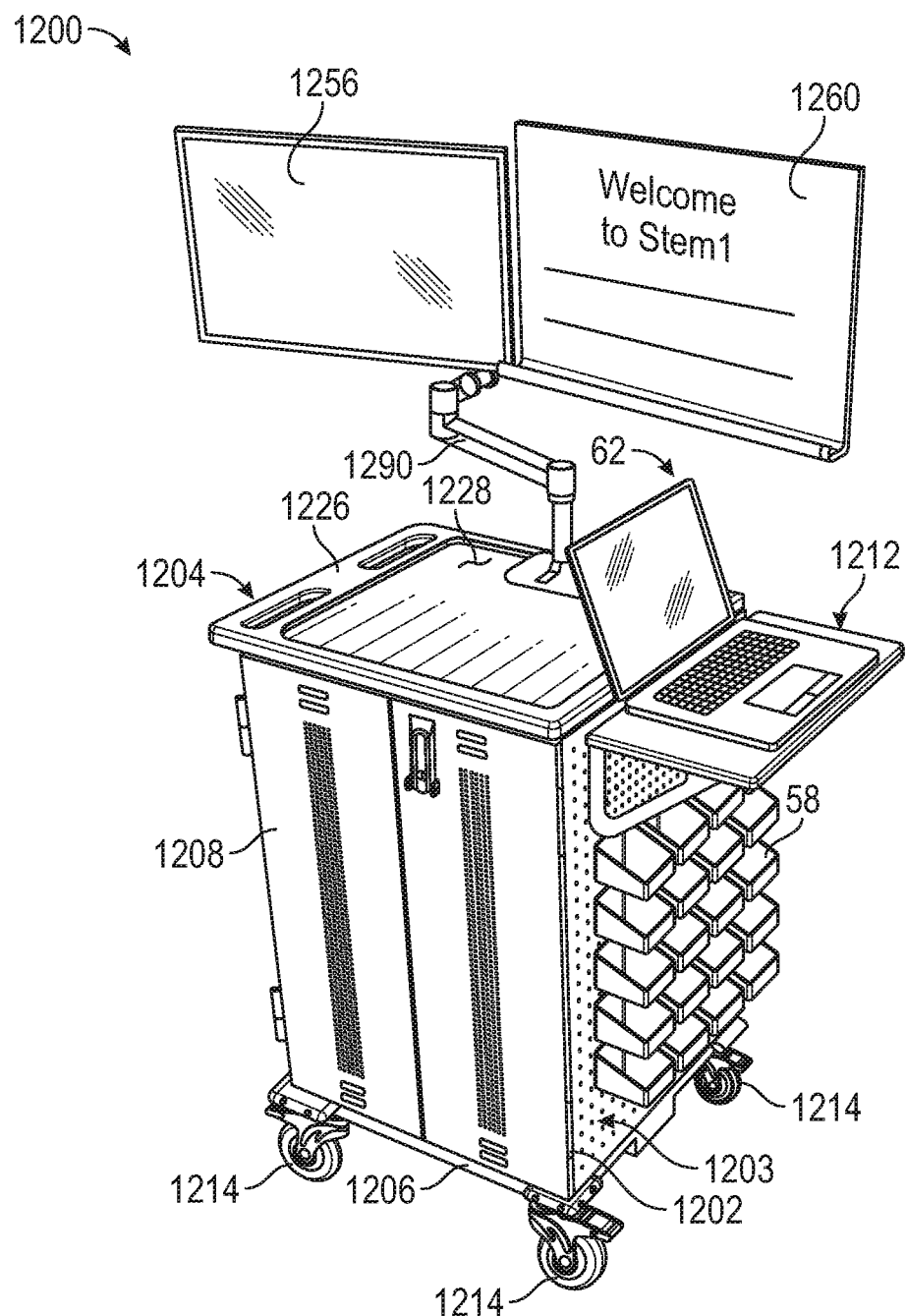
FIG. 12 illustrates a front isometric view of a storage and charging cart.

FIG. 12 illustrates a front isometric view of a storage and charging cart 1200. The storage and charging cart 1200 can include a frame 1202, a panel 1203, a top assembly 1204, a base 1206, a door 1208, a tray assembly 1212, and wheels 1214. The top assembly 1204 can include a handle 1226 and a top surface 1228.

The storage and charging cart 1200 can be similar to the storage and charging carts discussed above, except that the tray assembly is shown as supporting a laptop 62. FIG. 12 also shows that the arm 1290 can support both a monitor 54 and a drawing board 60. FIG. 12 further shows that the panel 1203 can support containers 58.

In general, storage and charging carts are used to store, charge, update and transport portable electronic devices within a facility. A typical storage and charging cart can include a wheeled base, and an upper surface that is parallel to and located at a distance from the wheeled base. A storage and charging cart can further have four sides including a front side and a rear side, and side walls connecting the front and rear sides. Front and rear sides, and side walls can be connected to the base on their bottom end and connected to the upper surface on their upper end to form an enclosure. The storage and charging cart can also include at least one door configured to selectively provide access to the interior space of the enclosure.

Typical storage and charging carts can include at least one shelf for portable electronic devices to rest on. A plurality of dividers can be attached to each shelf to form storage slots within the interior space of the enclosure and these slots can be adapted to hold at least a portion of the portable electronic devices. At least one, some, or all of the storage slots can include a connector for connecting to one tablet within a particular slot. The connector can be used to charge and update a portable electronic device when it is located inside the enclosure and connected to the connector.

An example of a charging and storage cart that can implement various techniques of this disclosure is illustrated in FIGS. 1A-3. The charging and storage cart can include a wheeled base and a top surface opposite to and located at a distance from the wheeled base.

The charging and storage cart can further include four sides located between the wheeled base and the upper surface to form the cart frame. The four sides can be connected to the wheeled base at their bottom end, and they can be connected to the upper surface at their upper end to form an enclosure. The four sides of the storage and charging cart can include a first side, a second side connected to the first side and extending in transverse direction to the first side, a third side opposite the first side and connected to the second side, and a fourth side opposite the second side and connected to the first side and the third side. A handle can be built in or attached to the upper surface to push the cart from one location to another.

The first side of the cart can include a first door and a second door configured to selectively provide access to the interior space of the cart. A first door hinge can be located at the intersection of the first side and the fourth side of the cart. The first door can be rotatingly coupled to the cart at the first door hinge. A second door hinge can be connected to the frame of the cart. The second door can be rotatingly coupled to the cart at the second door hinge. The first door and the second door can be selectively opened as illustrated in FIG. 1B to provide access to the interior space of the cart where portable electronic devices are located.

When the doors are closed as shown in FIG. 1A, a first lock can be adapted to lock the first door and the second door to the cart frame to prevent access to the interior space of the cart. In some example configurations, the first door and the second door can be replaced by a single door attached to the first side of the cart to provide access to the interior space of the cart.

One or more apertures can be formed on at least one of the sidewalk of the cart. These apertures can perform various functions. They can be adapted to aid in air ventilation to keep the internal space of the cart cool when the doors are closed, and cart is being used for charging portable electronic devices, Another function of the apertures can be to aid in attaching various accessories to the cart walls, such as a shelf, storage bins, tool holders, and others.

In an example, a grommet mounting hole can be formed on the upper surface of the charging and storage cart as illustrated in FIG. 1A. The grommet mounting hole can be sized, adapted, or otherwise arranged to receive a mounting arm that can hold a flat panel monitor and/or a writing board above the upper surface.

The internal space of the charging and storage cart is illustrated in FIG. 1B. One or more shelves can be positioned inside the cart to hold the portable electronic devices. The shelves can be connected to the second and fourth side walls of the cart.

One or more dividers can be attached to each shelf to create slots to hold at least a portion of the portable electronic devices. If there are two or more shelves inside a cart, a spacing between adjacent shelves can be selectively adjusted to accommodate various sizes and shapes of portable electronic devices. In some example configurations, some of the shelves can be removed to permit a large item, such as a printer, on one of the shelves.

A cross panel can be located at the interior space of the cart as illustrated in FIGS. 2 and 4. The cross panel can be connected to the second side and fourth side of the cart. It can span from the base to the upper surface of the cart, and it can be parallel to the first side and the third side of the cart. The cross panel can divide the interior space of the cart into two volumes. One volume can face the first side of the cart and it can be where the shelves that hold the portable electronic devices are located as illustrated in FIG. 1B. The other volume can face the third side of the cart and it can be where one or more power receptacles and power adapter storage shelves are located. The cross panel can allow access from one volume to the other.

The third side of the cart can include a third door configured to selectively provide access to the interior space of the cart. A third door hinge can be connected to the frame of the cart. The third door can be rotatingly coupled to the cart at the third door hinge. The third door can be selectively opened as illustrated in FIG. 2B to provide access to the interior space of the cart where power receptacles and power adapter storage shelves can be located.

When the third door is closed as shown in FIG. 2A, a second lock can be adapted to lock the third door to the cart frame to prevent access to the interior space of the cart. In some examples, the third door can be replaced by a set of doors attached to the third side of the cart to provide access to the interior space of the cart.

A power inlet can be connected to the outside surface of the cart frame. The power inlet can be adapted to receive one end of the power cord. The other end of the power cord can be connected to a power source, such as a wall socket, to provide electric power to the cart. In some examples, the power inlet can be located below the wheeled base as illustrated in FIG. 2A. The power inlet can be positioned in additional or alterative locations on the cart.

A power management system can be connected to the power inlet. Electric power received through the power inlet can be distributed to power receptacles located inside of the cart so that portable electronic devices connected to power receptacles can be charged. The power management system can control the distribution of the power to power receptacles. Power distribution can be based on a pre-selected algorithm, a timer, or other methods.

In some examples, power outlets can be located on the outside surfaces of the cart. External devices, such as a notebook computer, projector, flat panel display, or other electronic devices, can be selectively connected to the power outlets without opening the doors on the cart.

In some examples, one or more hooks can be attached to the side walls of the cart. The hooks can be used to store power cords when they are not used.

Apertures can be formed on at least one of the side walls of the charging and storage cart. These apertures can be any shape and size as illustrated in FIG. 4. The shape of the apertures can include, but are not limited to, round holes, slotted holes in various angles, key holes, and others. Key holes can be elongated holes with a larger diameter proximate the upper end of the hole compared to the lower end of the hole. Various accessories can be attached to the side walls of the cart using these apertures. Other accessories may include bins, hooks, enclosures, and others.

In some examples, accessories can be removably connected to the charging and storage cart. In other examples, accessories can be fixedly attached to the cart through the apertures located on the side walls. For example, a lock box can be aligned with the side wall of the cart, and a screw can be inserted from the inside of the cart through at least one aperture and threadingly engaged with a threaded hole located on the lock box to secure the lock box to the side of the cart. In this example, the lock box cannot be removed from the cart unless one of the doors located on the cart is unlocked and the attachment screw is removed from the lock box.

In some examples, accessories can include a tray as illustrated in FIGS. 1A-3. Various details of a tray assembly are illustrated in FIGS. 5A-6B. The tray assembly can include a tray having an upper surface and a lower surface opposite the upper surface. The tray can be in any shape including, but not limited to, a square, rectangle, and others. The upper surface of the tray can be used to store articles, such as a keyboard, notebook, tools, hardware, samples, and others, when the tray is connected to the charging and storage cart.

At least one support bracket can be connected to the lower surface of the tray. The support bracket can be a triangular shape, for example, as illustrated in FIGS. 7-8. Other shapes of support bracket are also possible and are considered within the scope of this disclosure. The support bracket can include a first side, a second side, and a third side, where the second side is perpendicular to the first side, and third side extends in a transverse direction to the second side. The third side of the support bracket can be connected to the lower surface of the tray.

The second side of the support bracket can include features to connect it to the storage and charging cart as illustrated in FIG. 5A-6B. A set of hooks can be attached proximate the upper end of the second side of the support bracket. These hooks can be aligned with a set of apertures located on the side walls of the charging and storage cart, and the tray assembly can be connected to the cart by inserting these hooks into the apertures. At least one spacer attached proximate the lower end of the second side of the support bracket can be useful to maintain flatness of the tray when it is attached to the cart.

An example of an attachment method for connecting the tray assembly to the side wall of a charging and storage cart using apertures is illustrated in FIG. 6A. A first hook and a second hook can be attached to the second side of the support bracket proximate to its upper end. The first hook and the second hook can be inserted into matching apertures located on the side wall of the cart to connect the keyboard tray to the cart. The hooks can be slightly curved to prevent them disengaging from the apertures unintentionally. In some non-limiting example configurations, only one hook can be used.

Other attachment methods are also possible to connect the tray assembly to the side wall of the cart using the apertures. Another attachment method is illustrated in FIG. 6B. A hook pin can be attached to the second side of the support bracket proximate its upper end. The hook pin can include a round shaft and a round head with a slightly larger diameter than the shaft diameter. The head of the hook pin can be inserted into a key hole proximate the upper end of the key hole, where the hole diameter is larger than the head diameter.

When the hook pin slides down inside the key hole, the head of the hook pin can be trapped behind the lower end of the key hole where the hole diameter is smaller than the head diameter. A surface of the head facing the support bracket can be slightly tapered allowing the hook pin to be inserted into a key hole by slightly angling the second side of the support bracket relative to the side of the cart. When the hook pin is positioned at the lower end of the key hole, the second side of the support bracket can be parallel to the side wall of the cart, and a locater pin can be inserted into a matching aperture located on the side wall of the cart. The locator pin can prevent the hook pin from unintentionally moving upward and disengaging from the key hole. To remove the tray from the cart, the support bracket can be angled to disengage the locator pin from an aperture, and the tray assembly can be lifted to remove it from a key hole.

The tray assembly can be selectively attached to the side of the cart at various heights as illustrated in FIGS. 1A and 3. Using various attachment methods described in this disclosure, pins connected to the support bracket and matching hole patterns located on the side of the charging and storage cart can allow the tray assembly to be easily detached from the cart and reattached to the cart at a different height.

Charging and storage carts can be in various sizes to hold various numbers of portable electronic devices. A smaller size of charging and storage cart is illustrated in FIGS. 7A-8B. Various examples described above can be applicable to different sizes of carts and are considered within the scope of this disclosure.

Various examples of charging and storage carts utilizing the features described above are discussed in the following paragraphs.

Another example of a charging and storage cart is illustrated in FIGS. 9A-9B. The charging and storage cart can include a wheeled base, a top surface, and four side walls connecting the wheeled base to the top surface. Several portable electronic devices can be located inside the charging and storage cart to charge them and update their content. A mounting arm can be connected to the top surface of the cart through the grommet mounting hole located on the top surface. The mounting arm can include a mounting bracket, and a flat panel display can be attached to the mounting bracket, for example.

A door can be attached to the second side of the cart to selectively provide access to the internal space of the cart. A lock can lock the door to the cart frame to secure the portable electronic devices inside the cart. One or more apertures can be formed on at least the first side of the cart to mount accessories on to the cart. A keyboard tray, various sizes of storage bins, and tool holders can be attached to the cart through the apertures.

A power management and syncing system can be located inside the charging and storage cart. The power management system can selectively distribute the power received from a power source to power receptacles inside the cart to charge portable electronic devices, and the syncing system can update the content of the portable electronic devices. The syncing system can either receive content wirelessly or by wired connection to a computer, e.g. a resident computer. In some examples, one or both of the power management system and the syncing system can be connected to a resident computer on the cart, and a status of charging and updating the content of portable electronic devices can be shown on the flat panel display. Various alerts can be generated based on the status update. These alerts can include, but are not limited to, completion of charging and update to indicate which portable devices are ready for removal from the cart, availability of power, and others.

In some examples, the power management and syncing systems can be removably attached to the cart. They can be selectively removed from the cart to use the cart mainly for storage purposes for portable electronic devices.

Another example of a charging and storage cart is illustrated in FIG. 9A. The charging and storage cart can include a wheeled base, a top surface, and four side walls connecting the wheeled base to the top surface. Several portable electronic devices can be located inside the charging and storage cart to charge them and update their content.

A mounting arm can be connected to the top surface of the cart through the grommet mounting hole located on the top surface. The mounting arm can include a mounting bracket, and a writing board can be connected to the mounting bracket.

A door can be attached to the second side of the cart to selectively provide access to the internal space of the cart. A lock can lock the door to the cart frame to secure the portable electronic devices located inside the cart. One or more apertures can be formed on at least the first side of the cart to mount accessories on to the cart. A large worksurface, various sizes of storage bins, and tool holders can be attached to the cart through the apertures.

Another example of a charging and storage cart is illustrated in FIG. 10. The charging and storage cart can include a wheeled base, a top surface, and four side walls connecting the wheeled base to the top surface. Several portable electronic devices can be located inside the charging and storage cart to charge them and update their content.

A mounting arm can be connected to the top surface of the cart through the grommet mounting hole located on the top surface. A bow can be connected to the upper end of the mounting arm. One or more mounting brackets can be connected to the box to hold a writing board and a flat panel display, e.g., side by side. The mounting brackets can be slidably engaged with the bow to adjust the distance between the writing board and the flat panel display.

A door can be attached to the second side of the cart to selectively provide access to the internal space of the cart. A lock can lock the door to the cart frame to secure the portable electronic devices located inside the cart. One or more apertures can be formed on at least the first side of the cart to mount accessories on to the cart. A large worksurface, various sizes of storage bins, and tool holders can be attached to the cart through apertures.

Another example of a charging and storage cart is illustrated in FIG. 11. The charging and storage cart can include a wheeled base, a top surface, and four side walls connecting the wheeled base to the top surface. Several portable electronic devices can be located inside the charging and storage cart to charge them and update their content. A mounting arm can be connected to the top surface of the cart through the grommet mounting hole located on the top surface. A bow can be connected to the upper end of the mounting arm.

One or more mounting brackets can be connected to the box to hold a writing board and a flat panel display side by side. The mounting brackets can be slidably engaged with the how to adjust the distance between the writing board and the flat panel display. A first door and a second door can be attached to the first side of the cart to selectively provide access to the internal space of the cart. A lock can lock the doors to the cart frame to secure the portable electronic devices located inside the cart, One or more apertures can be formed on at least the second side of the cart to mount accessories on to the cart. A notebook tray, various sizes of storage bins, and tool holders can be attached to the cart through apertures.

The mounting arm can include a first arm and a second arm as illustrated in FIG. 12. The first arm can be a fixed height arm, and the second arm can be a height adjustable arm to provide height adjustment for the mounting bracket. A pivot can be connected between the second arm and the mounting bracket to provide angular adjustment for the mounting bracket. Both arms and the pivot can be rotatingly coupled to each other at their connection surfaces to provide articulation to the mounting bracket. Using the mounting arm assembly, the flat panel display or the writing board or a combination of the display and board can be oriented in various positions to make them visible in any direction.

NOTES AND EXAMPLES

The following, non-limiting examples, detail certain aspects of the present subject matter to solve the challenges and provide the benefits discussed herein, among others.

Example 1 is a charging and storage cabinet configured to support and charge a plurality of electronic devices, the charging and storage cart comprising: a frame; a panel secured to the frame, the panel including a body and plurality of apertures extending through the body; a tray configured to support equipment thereon; a support bracket coupled to the tray and configured to engage the panel to support the tray; and an extension connected to the support bracket and extending therefrom, the extension insertable into any aperture of the plurality of apertures to connect the tray to the body of the panel in any location as desired.

In Example 2, the subject matter of Example 1 optionally includes wherein the frame is supported by a plurality of wheels.

In Example 3, the subject matter of any one or more of Examples 1-2 optionally include wherein the tray assembly further comprises a spacer connected to the support bracket and engageable with the panel to orient the tray in a level position when the tray is secured to the panel by the extension.

In Example 4, the subject matter of any one or more of Examples 1-3 optionally include wherein the tray assembly further comprises a locator pin connected to the support bracket away from the extension, the locator pin insertable into any of the apertures to limit vertical and horizontal movement of the tray assembly with respect to the panel.

In Example 5, the subject matter of any one or more of Examples 1-4 optionally include a second support bracket coupled to the tray and configured to engage the panel to, together with the support bracket, support the tray assembly on the panel.

In Example 6, the subject matter of Example 5 optionally includes a second extension connected to the support bracket near the first support, the second extension extending from the support bracket, and the extension insertable into any aperture of the plurality of apertures to, together with the extension, connect the tray to the body of the panel.

In Example 7, the subject matter of any one or more of Examples 5-6 optionally include a third extension connected to the second support bracket and extending therefrom, the third extension insertable into any aperture of the plurality of apertures to connect the tray to the body of the panel.

In Example 8, the subject matter of any one or more of Examples 1-7 optionally include wherein the extension comprises: a shaft connected to the support bracket and extending away from the support bracket, the shaft including a shaft diameter; and a head connected to the shaft, the head having a head diameter larger than the shaft diameter.

In Example 9, the subject flatter of Example 8 optionally includes wherein one or more aperture is a key-hole aperture including an upper bore including an upper diameter and a slot connected to a bottom portion of the upper bore, the slot having a size smaller than the upper diameter; the key-hole aperture configured to receive the shaft and the head of the extension therein to secure the tray to the panel.

In Example 10, the subject matter of Example 9 optionally includes wherein the upper diameter is larger than the head diameter and wherein the slot is smaller than the head diameter and larger than the shaft diameter such that the head is insertable past the upper bore of the key-hole aperture to allow the shaft to be inserted into the slot; where a distal surface of the head can engage a proximal surface of the panel to limit movement of the extension and the tray with respect to the panel.

In Example 11, the subject matter of Example 10 optionally includes wherein the distal surface of the head is angled to allow the extension to be inserted into the key-hole when the tray is positioned at a non-perpendicular angle with respect to the panel.

In Example 12, the subject matter of any one or more of Examples 1-11 optionally include wherein the tray assembly further comprises a support plate connected to the support bracket, the support plate extending parallel to a face of the panel and configured to engage the panel when the tray assembly is secured to the panel.

In Example 13, the subject matter of any one or more of Examples 1-12 optionally include wherein the tray assembly is securable to the panel at a plurality of heights along the panel.

In Example 14, the subject matter of any one or more of Examples 1-13 optionally include wherein the extension is an upturned hook.

Example 15 is a charging and storage cart comprising: a frame supported by a plurality of wheels; a shelf supported by the frame and configured to support an electronic device therein; a panel secured to the frame, the panel including a body and plurality of apertures extending into the body; and a tray assembly removably connectable to the panel, the tray assembly comprising: a tray configured to support equipment thereon; a support bracket coupled to the tray and configured to engage the panel to support the tray assembly; and an extension connected to the support bracket and extending therefrom, the extension insertable into any aperture of the plurality of apertures to connect the tray to the body of the panel in any location as desired.

In Example 16, the subject matter of Example 15 optionally includes a second support bracket coupled to the tray and configured to engage the panel to, together with the support bracket, support the tray assembly on the panel.

In Example 17, the subject matter of any one or more of Examples 15-16 optionally include wherein the extension comprises: a shaft connected to the support bracket and extending away from the support bracket, the shaft including a shaft diameter; and a head connected to the shaft, the head having a head diameter larger than the shaft diameter.

In Example 18, the subject matter of Example 17 optionally includes wherein one or more aperture is a key-hole aperture including an upper bore including an upper diameter and a slot connected to a bottom portion of the upper bore, the slot having a size smaller than the upper diameter, the key-hole aperture configured to receive the shaft and the head of the extension therein to secure the tray to the panel.

In Example 19, the subject matter of Example 18 optionally includes wherein the upper diameter is smaller than the head diameter and wherein the slot is smaller than the head diameter and larger than the shaft diameter such that the head is insertable past the upper bore of the key-hole aperture to allow the shaft to be inserted into the slot, where a distal surface of the head can engage a proximal surface of the panel to limit movement of the extension and the tray with respect to the panel.

In Example 20, the subject matter of Example 19 optionally includes wherein the distal surface of the head is angled to allow extension to be inserted into the key-hole when the tray is positioned at a non-perpendicular angle with respect to the panel.

Example 21 is a charging and storage cart comprising: a frame supported by a plurality of wheels; a shelf supported by the frame and configured to support at least one electronic device thereon; a charger coupled to the shelf and connectable to the electronic device to deliver power thereto; a door connected to the frame and movable between an open and closed position; a panel secured to the frame, the panel including a body and plurality of apertures extending into the body; and a tray assembly removably connectable to the panel, the tray assembly comprising: a tray configured to support equipment thereon; a support bracket coupled to the tray and configured to engage the panel to support the tray assembly; and an extension connected to the support bracket and extending therefrom, the extension insertable into any aperture of the plurality of apertures to connect the tray to the body of the panel.

In Example 22, the subject matter of Example 7 optionally includes wherein the tray assembly further comprises: a first locator pin connected to the support bracket away from the extension, the first locator pin insertable into any aperture of the plurality of apertures to limit vertical and horizontal movement of the tray assembly with respect to the panel; and a second locator pin connected to the second support bracket away from the second extension, the second locator pin insertable into another aperture of the plurality of apertures to, together with the first locator pin, limit vertical and horizontal movement of the tray assembly with respect to the panel.

In Example 23, the apparatuses or method of any one or any combination of Examples 1-22 can optionally be configured such that all elements or options recited are available to use or select from.

Each of these non-limiting examples can stand on its own or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The invention claimed is:

1. A charging and storage cabinet configured to support and charge a plurality of electronic devices, the charging and storage cabinet comprising:
   a frame;
   a panel secured to the frame, the panel including a body and plurality of apertures extending through the body;
   a tray assembly configured to support equipment thereon;
   a support bracket coupled to the tray assembly and configured to engage the panel to support the tray assembly; and
   an extension connected to the support bracket and extending therefrom, the extension insertable into any aperture of the plurality of apertures to connect the tray assembly to the body of the panel in any location as desired;
   wherein the tray assembly includes a locator pin connected to the support bracket away from the extension, the locator pin insertable into any of the apertures to limit vertical and horizontal movement of the tray assembly with respect to the panel.

2. The charging and storage cabinet of claim 1, wherein the frame is supported by a plurality of wheels.

3. The charging and storage cabinet of claim 1, wherein the tray assembly further comprises a spacer connected to the support bracket and engageable with the panel to orient the tray assembly in a level position when the tray assembly is secured to the panel by the extension.

4. The charging and storage cabinet of claim 1, further comprising:
   a second support bracket coupled to the tray assembly and configured to engage the panel to, together with the support bracket, support the tray assembly on the panel.

5. The charging and storage cabinet of claim 4, further comprising:
   a second extension connected to the second support bracket near the support bracket, the second extension extending from the second, support bracket, and the second extension insertable into any aperture of the plurality of apertures to, together with the extension, connect the tray assembly to the body of the panel.

6. The charging and storage cabinet of claim 4, further comprising:
   a third extension connected to the second support bracket and extending therefrom, the third extension insertable into any aperture of the plurality of apertures to connect the tray assembly to the body of the panel.

7. A charging and storage cabinet configured to support and charge a plurality of electronic devices, the charging and storage cabinet comprising:
   a frame;
   a panel secured to the frame, the panel including a body and plurality of apertures extending through the body;
   a tray configured to support equipment thereon;
   a support bracket coupled to the tray and configured to engage the panel to support the tray; and
   an extension connected to the support bracket and extending therefrom, the extension insertable into any aperture of the plurality of apertures to connect the tray to the body of the panel in any location as desired, the extension including:
      a shaft connected to the support bracket and extending away from the support bracket, the shaft having a shaft diameter; and a head connected to the shaft, the head having a head diameter larger than the shaft diameter.

8. The charging and storage cabinet of claim 7, wherein one or more aperture is a key-hole aperture including an upper bore including an upper diameter and a slot connected to a bottom portion of the upper bore, the slot having a size smaller than the upper diameter, the key-hole aperture configured to receive the shaft and the head of the extension therein to secure the tray to the panel.

9. The charging and storage cabinet of claim 8, wherein the upper diameter is larger than the head diameter and wherein the slot is smaller than the head diameter and larger than the shaft diameter such that the head is insertable past the upper bore of the key-hole aperture to allow the shaft to be inserted into the slot, where a distal surface of the head can engage a proximal surface of the panel to limit movement of the extension and the tray with respect to the panel.

10. The charging and storage cabinet of claim 9, wherein the distal surface of the head is angled to allow the extension to be inserted into the key-hole aperture when the tray is positioned at a non-perpendicular angle with respect to the panel.

11. The charging and storage cabinet of claim 7, wherein the tray further comprises a support plate connected to the support bracket, the support plate extending parallel to a face of the panel and configured to engage the panel when the tray is secured to the panel.

12. The charging and storage cabinet of claim 7, wherein the tray is securable to the panel at a plurality of heights along the panel.

13. The charging and storage cabinet of claim 7, wherein the extension is an upturned hook.

14. A charging and storage cart comprising:
a frame supported by a plurality of wheels;
a shelf supported by the frame and configured to support an electronic device therein;
a panel secured to the frame, the panel including a body and plurality of apertures extending into the body; and
a tray assembly removably connectable to the panel, the tray assembly comprising:
a tray configured to support equipment thereon;
a support bracket coupled to the tray and configured to engage the panel to support the tray assembly; and
an extension connected to the support bracket and extending therefrom, the extension insertable into any aperture of the plurality of apertures to connect the tray to the body of the panel in any location as desired, the extension including:
a shaft connected to the support, bracket and extending away from the support bracket, the shaft having a shaft diameter; and
a head connected to the shaft, the head having a head diameter larger than the shaft diameter.

15. The charging and storage cart of claim 14, further comprising:
a second support bracket coupled to the tray and configured to engage the panel to, together with the support bracket, support the tray assembly on the panel.

16. The charging and storage cart of claim 14, wherein one or more aperture is a key-hole aperture including an upper bore including an upper diameter and a slot connected to a bottom portion of the upper bore, the slot having a size smaller than the upper diameter, the key-hole aperture configured to receive the shaft and the head of the extension therein to secure the tray to the panel.

17. The charging and storage cart of claim 16, wherein the upper diameter is smaller than the head diameter and wherein the slot is smaller than the head diameter and larger than the shaft diameter such that the head is insertable past the upper bore of the key-hole aperture to allow the shaft to be inserted into the slot, where a distal surface of the head can engage a proximal surface of the panel to limit movement of the extension and the tray with respect to the panel.

18. The charging and storage cart of claim 17, wherein the distal surface of the head is angled to allow extension to be inserted into the key-hole aperture when the tray is positioned at a non-perpendicular angle with respect to the panel.

* * * * *

UNITED STATES PATENT AND TRADEMARK OFFICE
CERTIFICATE OF CORRECTION

| | |
|---|---|
| PATENT NO. | : 11,332,177 B2 |
| APPLICATION NO. | : 16/775007 |
| DATED | : May 17, 2022 |
| INVENTOR(S) | : Lucas et al. |

It is certified that error appears in the above-identified patent and that said Letters Patent is hereby corrected as shown below:

In the Claims

In Column 18, Line 41, in Claim 5, delete "second," and insert --second-- therefor In Column 20, Line 9 (Approx.), in Claim 14, delete "support," and insert --support-- therefor Signed and Sealed this
Twentieth Day of December, 2022

Katherine Kelly Vidal
*Director of the United States Patent and Trademark Office*